(12) United States Patent
Mukai et al.

(10) Patent No.: US 6,516,152 B1
(45) Date of Patent: Feb. 4, 2003

(54) FOCUSING SCREEN FOR USE IN CAMERA

(75) Inventors: Hiromu Mukai, Kawachinagano (JP); Shigeto Ohmori, Kawachinagano (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/568,483

(22) Filed: May 10, 2000

(30) Foreign Application Priority Data

| May 13, 1999 | (JP) | H11-132202 |
| May 13, 1999 | (JP) | H11-132203 |
| May 13, 1999 | (JP) | H11-132204 |
| May 13, 1999 | (JP) | H11-132205 |

(51) Int. Cl.$^7$ ............... G03B 13/24; G03B 13/06
(52) U.S. Cl. ................... 396/150; 396/152
(58) Field of Search ................. 396/373, 150, 396/152; 359/574, 575

(56) References Cited

U.S. PATENT DOCUMENTS

| 4,336,989 A | 6/1982 | Matsumura et al. ........ 396/150 |
| 4,598,977 A | 7/1986 | Kobayashi ................ 359/574 |
| 4,632,531 A | * 12/1986 | Ichihara et al. ............ 396/150 |
| 4,982,214 A | 1/1991 | Matsui ....................... 396/150 |
| 5,085,977 A | * 2/1992 | Sugawara et al. .......... 396/150 |
| 5,089,835 A | * 2/1992 | Kitagishi .................... 396/150 |
| 5,119,124 A | * 6/1992 | Ito et al. ..................... 396/147 |
| 5,161,058 A | * 11/1992 | Matsui ....................... 359/574 |
| 6,157,487 A | * 12/2000 | Staub et al. ................ 359/575 |

FOREIGN PATENT DOCUMENTS

| JP | 57-130023 | 8/1982 |
| JP | 05053174 | 3/1993 |
| JP | 08129205 | 5/1996 |

* cited by examiner

*Primary Examiner*—Christopher Mahoney
(74) *Attorney, Agent, or Firm*—Burns, Doane, Swecker & Mathis, LLP

(57) ABSTRACT

A focusing screen for use in a camera has a diffusive surface having a plurality of random pattern cells of one or a plurality of types arranged two-dimensionally so as to form a macroscopically flat surface. The random pattern cells are each composed of a plurality of minute rectangular elements having one of two to eight types of heights, and the individual rectangular elements are arranged irregularly so as to constitute a plurality of types of diffraction gratings having different grating pitches.

23 Claims, 24 Drawing Sheets

| 28 | 28 | 28 | 0  | 0  | 0  | 0  | 0  | 0  | 0  | 0  | 0  | 83 | 83 | 56 | 56 | 56 | 56 | 56 | 28 | 28 |
|----|----|----|----|----|----|----|----|----|----|----|----|----|----|----|----|----|----|----|----|----|
| 28 | 28 | 28 | 0  | 0  | 0  | 0  | 0  | 0  | 0  | 0  | 0  | 0  | 83 | 83 | 56 | 56 | 56 | 56 | 28 | 28 |
| 28 | 28 | 0  | 83 | 83 | 83 | 83 | 0  | 0  | 0  | 0  | 0  | 0  | 0  | 83 | 83 | 56 | 56 | 28 | 28 | 28 |
| 28 | 28 | 83 | 83 | 83 | 83 | 83 | 83 | 0  | 0  | 0  | 0  | 0  | 0  | 0  | 0  | 83 | 0  | 0  | 0  | 0  |
| 28 | 28 | 56 | 83 | 83 | 83 | 83 | 83 | 83 | 0  | 0  | 0  | 0  | 0  | 0  | 0  | 0  | 0  | 0  | 0  | 0  |
| 28 | 28 | 56 | 56 | 83 | 83 | 83 | 83 | 83 | 0  | 0  | 0  | 0  | 0  | 0  | 0  | 0  | 0  | 0  | 0  | 0  |
| 28 | 28 | 56 | 56 | 56 | 56 | 56 | 56 | 56 | 28 | 28 | 28 | 28 | 0  | 0  | 0  | 0  | 0  | 0  | 0  | 0  |
| 28 | 28 | 56 | 56 | 56 | 56 | 56 | 56 | 56 | 56 | 28 | 28 | 28 | 28 | 28 | 0  | 0  | 0  | 0  | 0  | 0  |
| 28 | 28 | 28 | 56 | 56 | 56 | 56 | 56 | 56 | 56 | 56 | 28 | 28 | 28 | 28 | 28 | 28 | 28 | 0  | 0  |    |
| 28 | 28 | 28 | 28 | 56 | 56 | 56 | 56 | 56 | 56 | 56 | 56 | 28 | 28 | 28 | 28 | 28 | 28 | 28 | 28 |    |
| 28 | 28 | 28 | 28 | 28 | 56 | 56 | 56 | 56 | 56 | 56 | 56 | 56 | 56 | 56 | 28 | 28 | 28 | 28 | 28 | 28 |
| 28 | 28 | 28 | 28 | 0  | 0  | 83 | 56 | 56 | 56 | 56 | 56 | 56 | 56 | 56 | 56 | 28 | 28 | 28 | 28 | 28 |
| 0  | 0  | 0  | 0  | 0  | 0  | 83 | 83 | 56 | 56 | 56 | 56 | 56 | 56 | 56 | 56 | 56 | 28 | 28 | 28 | 28 |
| 0  | 0  | 0  | 0  | 0  | 0  | 83 | 83 | 56 | 56 | 56 | 56 | 56 | 56 | 56 | 56 | 56 | 28 | 28 | 28 | 28 |
| 0  | 0  | 0  | 0  | 0  | 83 | 83 | 83 | 56 | 56 | 56 | 56 | 56 | 56 | 56 | 56 | 83 | 0  | 0  | 0  | 0  |
| 0  | 0  | 0  | 0  | 0  | 83 | 83 | 83 | 56 | 56 | 56 | 56 | 56 | 56 | 83 | 83 | 83 | 0  | 0  | 0  | 0  |
| 0  | 0  | 0  | 0  | 0  | 83 | 83 | 56 | 56 | 56 | 56 | 56 | 56 | 83 | 83 | 83 | 83 | 0  | 0  | 0  | 0  |
| 28 | 28 | 28 | 0  | 0  | 83 | 56 | 56 | 56 | 56 | 56 | 56 | 56 | 83 | 83 | 0  | 0  | 0  | 0  | 0  | 0  |
| 28 | 28 | 28 | 28 | 28 | 56 | 56 | 56 | 56 | 56 | 56 | 56 | 56 | 83 | 0  | 0  | 0  | 0  | 0  | 0  | 0  |
| 28 | 28 | 28 | 28 | 28 | 56 | 56 | 56 | 56 | 56 | 56 | 56 | 83 | 0  | 0  | 0  | 0  | 0  | 0  | 0  | 0  |
| 28 | 28 | 28 | 28 | 28 | 56 | 56 | 56 | 56 | 56 | 56 | 83 | 0  | 0  | 0  | 0  | 0  | 0  | 28 | 28 | 0  |
| 28 | 28 | 28 | 28 | 28 | 83 | 83 | 83 | 83 | 83 | 83 | 83 | 0  | 0  | 0  | 0  | 0  | 28 | 28 | 28 | 28 |
| 28 | 28 | 28 | 28 | 0  | 0  | 83 | 83 | 83 | 83 | 83 | 0  | 0  | 0  | 0  | 0  | 28 | 28 | 28 | 28 | 28 |
| 28 | 28 | 28 | 28 | 0  | 0  | 0  | 83 | 83 | 83 | 0  | 0  | 0  | 0  | 0  | 0  | 28 | 28 | 28 | 28 | 28 |
| 28 | 28 | 28 | 0  | 0  | 0  | 0  | 0  | 0  | 0  | 0  | 0  | 0  | 0  | 28 | 28 | 28 | 28 | 28 |    |    |

FIG.20

| 28 | 28 | 0  | 0  | 28 | 28 | 0  | 83 | 83 | 83 | 0  | 83 | 83 | 56 | 28 | 28 | 0  | 83 | 83 | 0  | 0  |
|----|----|----|----|----|----|----|----|----|----|----|----|----|----|----|----|----|----|----|----|----|
| 28 | 28 | 28 | 0  | 0  | 0  | 0  | 83 | 83 | 83 | 83 | 83 | 83 | 56 | 56 | 28 | 0  | 83 | 83 | 83 | 0  |
| 28 | 28 | 28 | 0  | 0  | 0  | 0  | 83 | 83 | 83 | 83 | 83 | 83 | 56 | 28 | 28 | 28 | 83 | 83 | 83 | 0  |
| 28 | 56 | 83 | 83 | 0  | 0  | 0  | 83 | 83 | 83 | 83 | 83 | 56 | 56 | 28 | 28 | 28 | 56 | 56 | 0  | 0  |
| 28 | 28 | 83 | 83 | 83 | 83 | 83 | 56 | 56 | 56 | 56 | 56 | 56 | 56 | 28 | 28 | 28 | 28 | 28 | 28 | 0  |
| 0  | 0  | 0  | 83 | 83 | 56 | 56 | 56 | 56 | 56 | 56 | 56 | 56 | 56 | 56 | 56 | 28 | 28 | 28 | 28 | 28 |
| 0  | 0  | 28 | 56 | 56 | 56 | 28 | 28 | 28 | 56 | 56 | 56 | 83 | 83 | 56 | 56 | 28 | 0  | 0  | 28 | 28 |
| 0  | 28 | 28 | 56 | 56 | 28 | 28 | 28 | 28 | 56 | 56 | 56 | 83 | 83 | 56 | 28 | 28 | 0  | 0  | 0  | 28 |
| 56 | 56 | 56 | 56 | 56 | 28 | 28 | 28 | 28 | 56 | 56 | 56 | 83 | 83 | 0  | 28 | 28 | 0  | 83 | 0  | 28 |
| 56 | 56 | 56 | 56 | 56 | 28 | 28 | 56 | 56 | 56 | 56 | 56 | 56 | 83 | 0  | 28 | 28 | 56 | 83 | 56 | 56 |
| 56 | 56 | 83 | 83 | 0  | 28 | 56 | 56 | 83 | 83 | 56 | 56 | 56 | 83 | 83 | 0  | 56 | 56 | 56 | 56 | 56 |
| 28 | 28 | 0  | 0  | 0  | 28 | 56 | 56 | 83 | 0  | 0  | 0  | 83 | 83 | 83 | 0  | 0  | 83 | 56 | 56 | 56 |
| 28 | 28 | 0  | 0  | 0  | 0  | 56 | 56 | 83 | 0  | 0  | 0  | 83 | 56 | 56 | 0  | 0  | 0  | 0  | 28 | 28 |
| 56 | 56 | 56 | 83 | 0  | 0  | 83 | 83 | 83 | 0  | 0  | 0  | 83 | 56 | 56 | 28 | 0  | 0  | 0  | 28 | 28 |
| 56 | 56 | 56 | 56 | 56 | 0  | 83 | 83 | 56 | 56 | 56 | 83 | 83 | 56 | 56 | 28 | 0  | 83 | 83 | 56 | 56 |
| 56 | 56 | 83 | 56 | 28 | 28 | 0  | 83 | 56 | 56 | 56 | 56 | 56 | 56 | 28 | 28 | 56 | 56 | 56 | 56 | 56 |
| 28 | 0  | 83 | 0  | 28 | 28 | 0  | 83 | 83 | 56 | 56 | 56 | 28 | 28 | 28 | 28 | 56 | 56 | 56 | 56 | 56 |
| 28 | 0  | 0  | 0  | 28 | 28 | 56 | 83 | 83 | 56 | 56 | 56 | 28 | 28 | 28 | 28 | 56 | 56 | 28 | 28 | 0  |
| 28 | 28 | 0  | 0  | 28 | 56 | 56 | 83 | 83 | 56 | 56 | 56 | 28 | 28 | 28 | 56 | 56 | 56 | 28 | 0  | 0  |
| 28 | 28 | 28 | 28 | 28 | 56 | 56 | 56 | 56 | 56 | 56 | 56 | 56 | 56 | 56 | 56 | 83 | 83 | 0  | 0  | 0  |
| 0  | 28 | 28 | 28 | 28 | 28 | 28 | 56 | 56 | 56 | 56 | 56 | 56 | 56 | 83 | 83 | 83 | 83 | 83 | 28 | 28 |
| 0  | 0  | 56 | 56 | 28 | 28 | 28 | 56 | 56 | 83 | 83 | 83 | 83 | 83 | 0  | 0  | 0  | 83 | 83 | 56 | 28 |
| 0  | 83 | 83 | 83 | 28 | 28 | 28 | 56 | 83 | 83 | 83 | 83 | 83 | 83 | 0  | 0  | 0  | 0  | 28 | 28 | 28 |
| 0  | 83 | 83 | 83 | 0  | 28 | 56 | 56 | 83 | 83 | 83 | 83 | 83 | 83 | 0  | 0  | 0  | 0  | 28 | 28 | 28 |
| 0  | 0  | 83 | 83 | 0  | 28 | 28 | 56 | 83 | 83 | 0  | 83 | 83 | 83 | 0  | 28 | 28 | 0  | 0  | 28 | 28 |

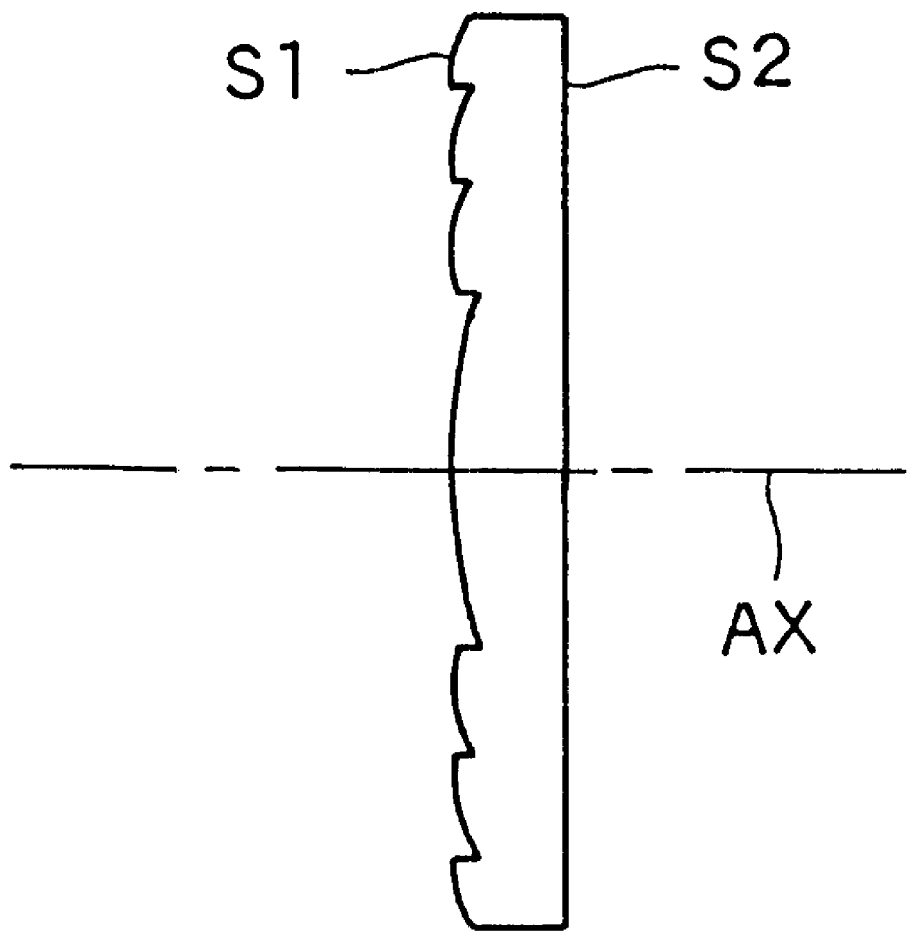

FOCUSING SCREEN FOR USE IN CAMERA

This application is based on applications Nos. H11-132202, H11-132203, H11-132204, and H11-132205 all filed in Japan on May 13, 1999, the entire content of which is hereby incorporated by reference.

BACKGROUND OF THE INVENTION

1. Field of the Invention

The present invention relates to a diffuser as exemplified by a focusing screen designed for use in a camera, for example a focusing screen incorporated in a viewfinder of a single-lens reflex camera, or a diffusive screen suitable as a screen for image projection.

2. Description of the Prior Art

The viewfinder of a common single-lens reflex camera is so configured that the light introduced through a taking lens is reflected from a main mirror in such a way as to form an image on a focusing screen having a light-diffusing function. The focusing screen is disposed at a position optically equivalent to the film surface, and therefore, by observing, through a pentagonal prism or eyepiece lens, the focus condition of the viewfinder screen formed on the focusing screen, it is possible to check the focus condition of the image that will be formed on the film surface.

The brightness and the degree of blurred appearance on the viewfinder screen depend on the diffusion angle with which the focusing screen diffuses light (i.e. how the focusing screen spreads light). Conventionally, a focusing screen is known that utilizes diffraction to diffuse light. In this type of focusing screen, diffraction is achieved by an array structure having one to several types of microstructures arranged in a pattern repeated with a pitch of about 20 μm (for example a microlens array structure, or an array structure having a plurality of minute conical, polygonal-pyramid-shaped, or otherwise shaped microprisms arranged in an array). Here, the diffusion angle can be controlled by how the microstructures forming the array structure are shaped and how the pattern thereof is repeated, and by controlling the diffusion angle in this way, it is possible to increase the brightness and simultaneously the degree of blurred appearance on the viewfinder screen. Increasing the degree of blurred appearance helps exaggerate blurred appearance when an image being observed is out of focus, and thereby makes it easy to check the focus condition.

However, a focusing screen having an array structure as described above does not diffuse light evenly, and thus does not offer natural blurred appearance. That is, this type of focusing screen suffers from unevenly bright blurred appearance (such as two-line blurred appearance). A focusing screen having a surface like that of frosted glass produces densely diffused light, and thus offers natural blurred appearance. However, this type of focusing screen diffuses light with too large a diffusion angle, with the result that the amount of light reaching the observer reduces quickly, making the viewfinder screen appear dim.

FIG. 7 shows an example of a conventionally well-known focusing screen. This focusing screen has a Fresnel lens surface (S1) formed on its side facing a taking lens (not shown), and has a diffusive surface (S2) formed on its side facing an eyepiece lens (not shown). The Fresnel lens surface (S1) has an optical power that tends to direct the off-axial rays incident on the viewfinder screen at the very edges thereof to the pupil (in other words, this surface has a light-condensing function). The light (L0) from a subject introduced through the taking lens is deflected by the Fresnel lens surface (S1) so as to form an image on the diffusive surface (S2), and then travels further, as diffused light, toward the eyepiece lens. Part of the diffusive surface (S2) is formed into a display surface (S2a), which is treated with a reflection enhancement process. This display surface (S2a) corresponds to display presented within the viewfinder screen as, for example, an AF (autofocus) frame. When the display surface (S2a) is illuminated with illumination light (L1), it acts as a prism to reflect the illumination light (L1) toward the eyepiece lens.

As described above, a conventional focusing screen typically achieves display by being illuminated at a display surface (S2a) formed therein. However, this is possible only when the focusing screen is treated partially with a reflection enhancement process to form a reflecting surface that serves as the display surface (S2a).

FIG. 36 shows another example of a conventionally known focusing screen. This focusing screen has a Fresnel lens surface (S1) formed on its side facing a taking lens (not shown), and has a diffusive surface (S2) formed on its side facing an eyepiece lens (not shown). The symbol AX represents the optical axis of the Fresnel lens surface (S1). The Fresnel lens surface (S1) has a light-condensing power that tends to direct the off-axial rays incident on the viewfinder screen at the very edges thereof to the pupil (so as to match pupils). The light introduced through the taking lens is deflected by the Fresnel lens surface (S1) so as to form an image on the diffusive surface (S2). This type of focusing screen structure is generally known. For example, Japanese Patent Application Laid-Open No. H8-129205 proposes a diffusive screen having on one side a diffusive surface (S2) formed by superimposing a directional pattern and a non-directional pattern on each other and having on the opposite side a Fresnel lens surface (S1).

In a case where, as shown in FIG. 36, the Fresnel lens surface (S1) is located away from the diffusive surface (S2), the imaging performance on the diffusive surface (S2) depends on the imaging performance of both the taking lens and the Fresnel lens surface (S1) considered together as a composite optical system. Thus, the Fresnel lens surface (S1) is one of the factors that degrade the imaging performance (for example aberration characteristics) of the taking lens. Bringing the Fresnel lens surface (S1) close to the diffusive surface (S2) or forming the Fresnel lens surface (S1) on the diffusive surface (S2) causes the zonal fringes (i.e. concentric circular lines) of the Fresnel lens surface (S1) to be observed through the eyepiece lens. This, too, degrades the imaging performance. On the other hand, locating the Fresnel lens surface (S1) farther away from the diffusive surface (S2) not only degrades the aberration characteristics and other performance mentioned above, but also causes vignetting that reduces the amount of light reaching the edge portion of the viewfinder screen and thus makes it appear dim.

SUMMARY OF THE INVENTION

An object of the present invention is to provide a focusing screen that offers a satisfactorily high degree of blurred appearance with even brightness and that offers a bright screen.

To achieve the above object, according to one aspect of the present invention, a focusing screen for use in a camera is provided with a diffusive surface having a plurality of random pattern cells of one or a plurality of types arranged two-dimensionally so as to form a macroscopically flat surface. Here, the random pattern cells are each composed of a plurality of minute rectangular elements having one of two to eight types of heights. Moreover, the individual rectangular elements are arranged irregularly so as to constitute a plurality of types of diffraction gratings having different grating pitches.

According to another aspect of the present invention, a focusing screen for use in a camera is provided with a diffusive surface having a plurality of random pattern cells of one or a plurality of types arranged two-dimensionally so as to form a macroscopically flat surface. Here, the random pattern cells are each composed of a plurality of minute rectangular elements having one of three or more types of heights. Moreover, the individual rectangular elements are arranged irregularly so as to constitute a plurality of types of diffraction gratings having different grating pitches. Furthermore, the rectangular elements each have their top-end surfaces formed into a convex shape.

According to another aspect of the present invention, a focusing screen for use in a camera is provided with a diffusive surface having a plurality of random pattern cells of one or a plurality of types arranged two-dimensionally so as to form a macroscopically flat surface. Here, the random pattern cells are each composed of a plurality of minute rectangular elements having one of three or more types of heights. Moreover, the individual rectangular elements are arranged irregularly so as to constitute a plurality of types of diffraction gratings having different grating pitches. Furthermore, this focusing screen is further provided with a display surface that is disposed on the identical plane on which the diffusive surface is disposed and that is formed as a diffraction grating configured so as to have regular periodic structures.

According to another aspect of the present invention, a focusing screen for use in a camera is provided with a diffusive surface having a plurality of random pattern cells of a plurality of types arranged two-dimensionally so as to form a macroscopically flat surface. Here, the random pattern cells are each composed of a plurality of minute rectangular elements having one of two or more types of heights. Moreover, the individual rectangular elements are arranged irregularly so as to constitute a plurality of types of diffraction gratings having different grating pitches. Furthermore, the rectangular elements have an increasingly large proportion of high-frequency components from the center to the edge of the focusing screen.

According to another aspect of the present invention, a diffuser is provided with a diffusive surface having a plurality of random pattern cells of one or a plurality of types arranged two-dimensionally so as to form a macroscopically flat surface. Here, the random pattern cells are each composed of a plurality of minute rectangular elements having one of three or more types of heights. Moreover, the individual rectangular elements are arranged irregularly so as to constitute a plurality of types of diffraction gratings having different grating pitches. Furthermore, the rectangular elements each have their top-end surfaces formed into a convex shape.

BRIEF DESCRIPTION OF THE DRAWINGS

This and other objects and features of the present invention will become clear from the following description, taken in conjunction with the preferred embodiments with reference to the accompanying drawings in which:

FIG. 17 is a diagram showing a principal portion of the random pattern structure shown in FIG. 15 as represented by the heights of the rectangular elements constituting it;

FIG. 20 is a diagram showing a principal portion of the random pattern structure shown in FIG. 18 as represented by the heights of the rectangular elements constituting it;

FIG. 36 is a sectional view of a conventional focusing screen.

DESCRIPTION OF THE PREFERRED EMBODIMENTS

Figure 2:
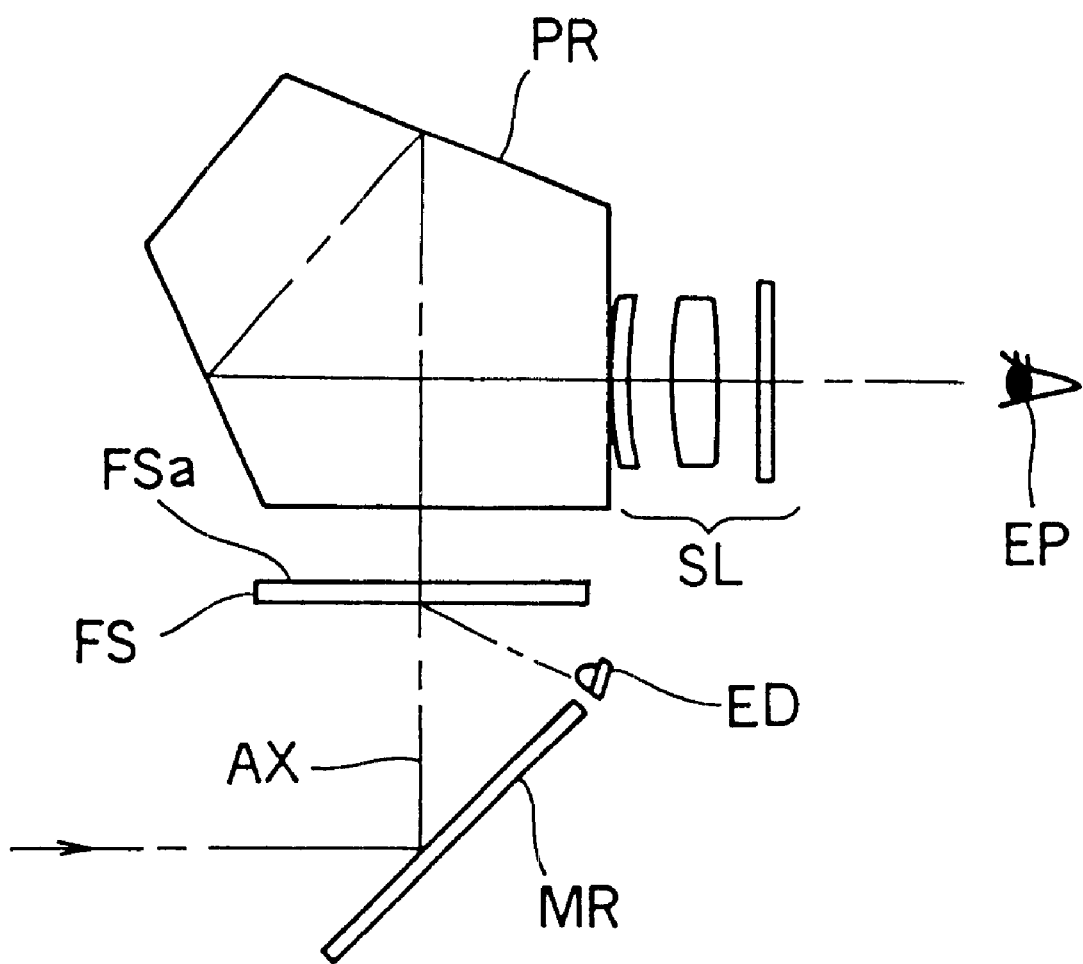
FIG. 2 is a sectional view showing the construction of a viewfinder for a single-lens reflex camera incorporating the focusing screen shown in FIG. 1.

Hereinafter, focusing screens embodying the present invention will be described with reference to the accompanying drawings. FIG. 2 shows the construction of a viewfinder for a single-lens reflex camera incorporating the focusing screen of a first embodiment of the present invention. This viewfinder for a single-lens reflex camera is composed of a main mirror (MR), a focusing screen (FS), a pentagonal prism (PR), an eyepiece lens (SL), an illumination light emitter (ED), and other components. On the upper surface of the focusing screen (FS) are formed a diffusive surface (FSa) having a light-diffusing function and a display surface (FSb, described later; see FIG. 3, for example) having an image-displaying function.

Figure 1:
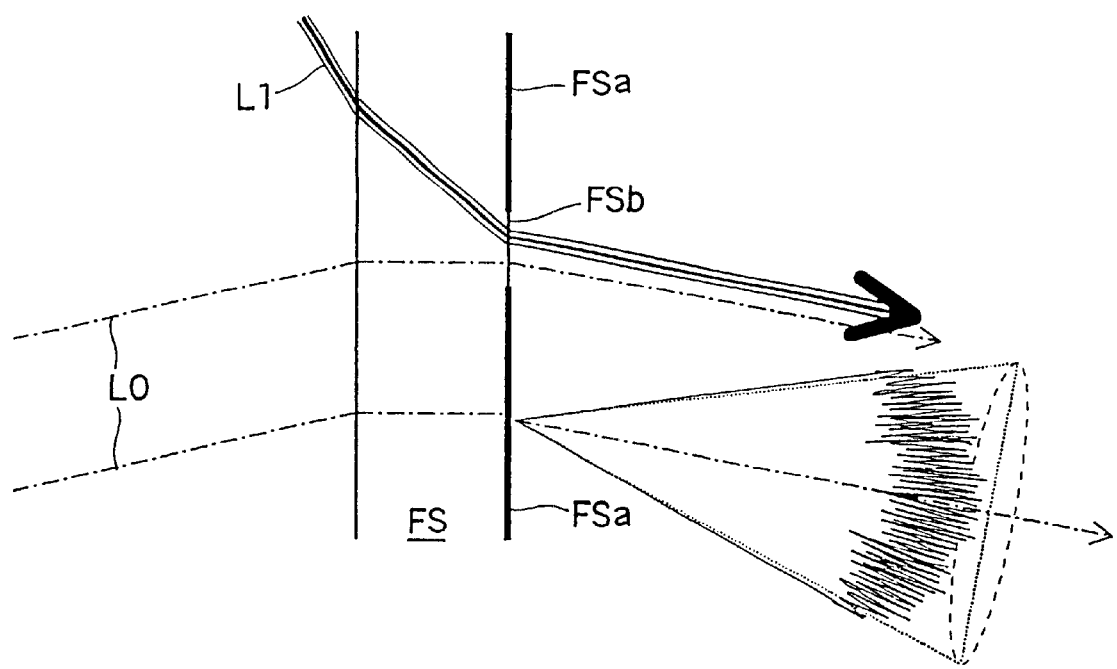
FIG. 1 is a sectional view of the focusing screen of a first embodiment of the invention.

As shown in FIG. 2, the light exiting from a taking lens (not shown) is reflected from the main mirror (MR). Then, as shown in FIG. 1, the light (L0) from a subject thus reflected from the main mirror (MR) forms an image on the diffusive surface (FSa) of the focusing screen (FS). The diffused light exiting from the image formed on the diffusive surface (FSa) is subjected to image inversion by the pentagonal prism (PR) as shown in FIG. 2, and then travels through the eyepiece lens (SL) to the pupil (EP). The diffusive surface (FSa) has a light-condensing power as will be described later, and therefore even the off-axial rays incident on the viewfinder screen at the very edges thereof, after image formation, travel, as diffused light, toward the center of the eyepiece lens (SL).

The diffusive surface (FSa) of the focusing screen (FS) is formed by arranging a plurality of random pattern structures of one or a plurality of types. These random pattern structures are each composed of a plurality of minute rectangular elements having a plurality of types of heights, and these rectangular elements are arranged irregularly so as to constitute a plurality of types of diffraction gratings having different grating pitches. These diffraction gratings of a plurality of types are formed, for example, as a CGH (computer generated hologram). By superimposing a plurality of periodic structures having different heights on one another over a plurality of periods as a CGH, a plurality of types of diffraction gratings having different grating pitches are formed, and, as a result, random pattern structures as mentioned above having rectangular elements arranged irregularly are formed. The multiple periodicity resulting from this superimposition permits light to be diffracted at many angles distributed densely over a predetermined range of angles, and thereby makes the brightness of blurred appearance even. Thus, it is possible to obtain a satisfactorily high degree of blurred appearance with even brightness (i.e. smooth and natural blurred appearance) and a bright viewfinder screen.

Figure 3:
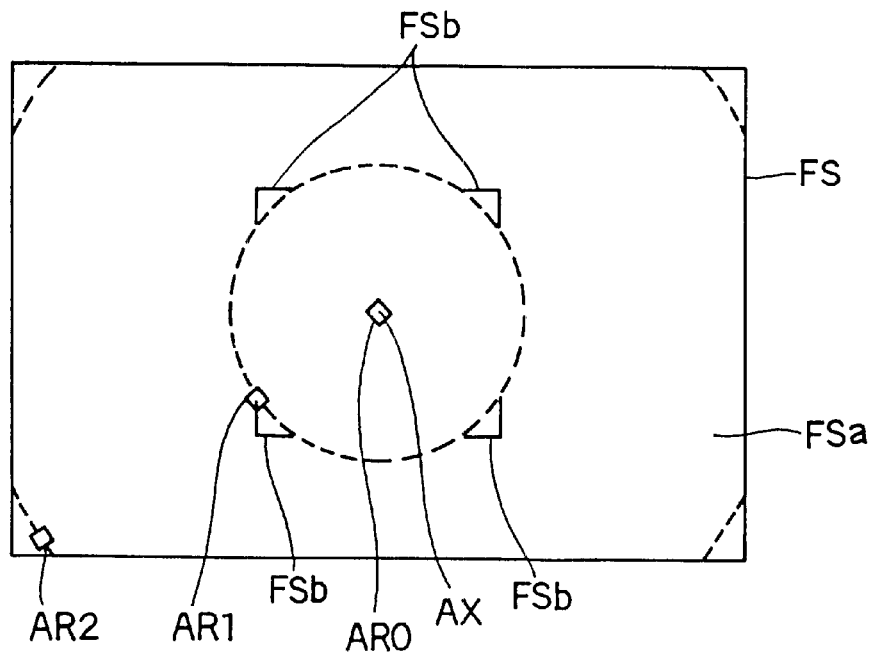
FIG. 3 is a plan view of the focusing screen shown in FIG. 1.

As described above, the diffusive surface (FSa) is composed of random pattern structures of a plurality of types. Here, the farther a random pattern structure is located away from the optical axis (AX) of the viewfinder optical system (i.e. the higher the image height), the larger the proportion of high-frequency components among the grating pitches found therein. That is, as shown in FIG. 3, if attention is paid to a central region (AR0), an intermediate region (AR1), and a peripheral region (AR2) of the viewfinder screen relative to the point at which the optical axis (AX) intersects it, the proportion of high-frequency components among the grating pitches (i.e. the proportion of diffraction gratings having comparatively small grating pitches) found in the random pattern structures located in those regions gradually increases in the order named. Moreover, the random pattern structures equidistant from the optical axis (AX) (i.e. the random pattern structures at identical image heights) have identical random patterns, and therefore identical random pattern structures are arranged concentrically around the optical axis (AX). This is true of any region located between the above-mentioned regions (AR0, AR1, and AR2).

Figure 4:
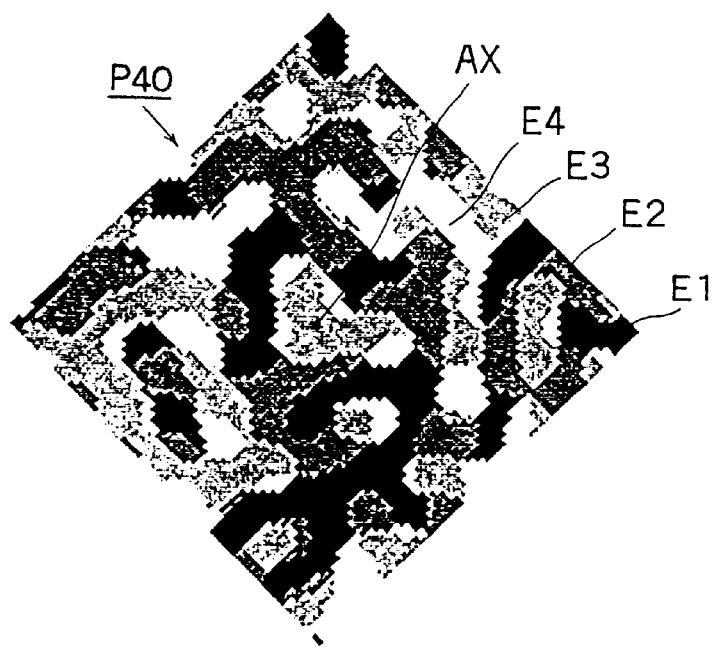
FIG. 4 is an enlarged view of the random pattern structure formed in the central region shown in FIG. 3.
Figure 5:
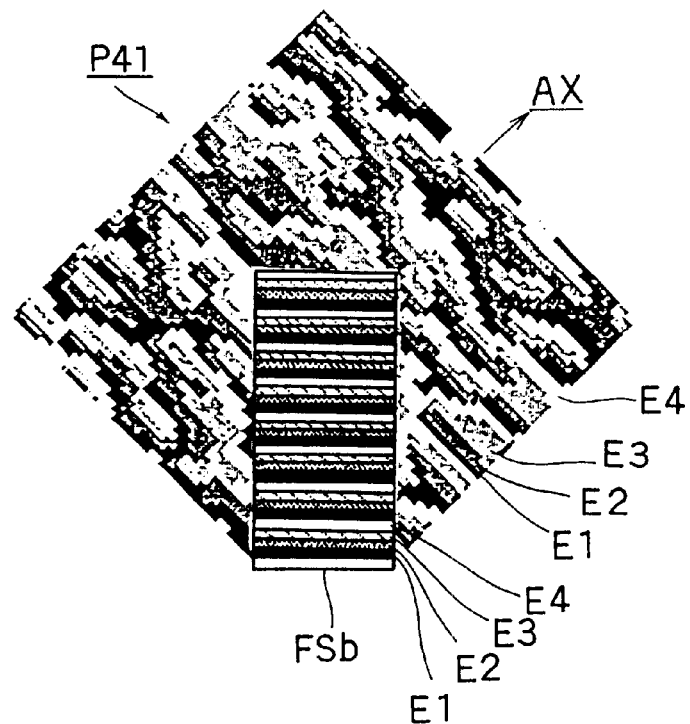
FIG. 5 is an enlarged view of the random pattern structure formed in the intermediate region shown in FIG. 3.
Figure 6:
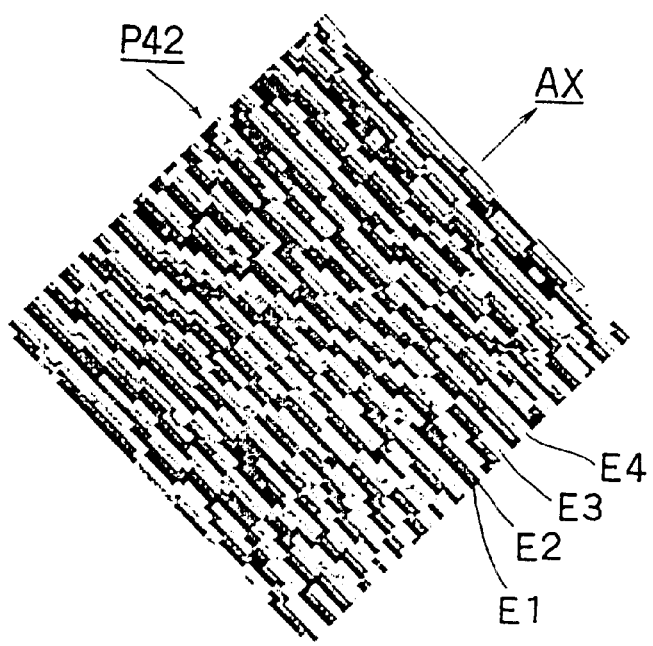
FIG. 6 is an enlarged view of the random pattern structure formed in the peripheral region shown in FIG. 3.

FIG. 4 shows the random pattern structure (P40) located in the central region (AR0), FIG. 5 shows the random pattern structure (P41) located in the intermediate region (AR1), and FIG. 6 shows the random pattern structure (P42) located in the peripheral region (AR2). Note that the optical axis (AX) of the viewfinder optical system (FIG. 2) passes at the center of the random pattern structure (P40) shown in FIG. 4 and at a point located to the upper right (as seen from the viewer of the figure) of the random pattern structures (P41 and P42) shown in FIGS. 5 and 6.

All of these random pattern structures (P40–P42) are composed of a plurality of minute rectangular elements (E1, E2, E3, and E4) having four types of heights, and these rectangular elements (E1–E4) are arranged irregularly so as to form a plurality of types of diffraction gratings having different grating pitches. The rectangular elements (E1–E4) each have a rectangular section along a plane parallel to the diffusive surface (FSa) and a square-wave-shaped section along a plane perpendicular to the diffusive surface (FSa). Accordingly, the above-mentioned diffraction gratings of a plurality of types are formed as phase-type multilevel diffraction gratings having binary structures of up to four levels.

The relationship between the shades with which the individual rectangular elements (E1–E4) are illustrated in FIGS. 4 to 6 and their heights h ($\mu$m) is shown in Table 1 below. Here, it is assumed that the focusing screen (FS) is made of PMMA (polymethyl methacrylate), and that its refractive index for the e line is ne=1.4914.

TABLE 1

<Heights of Rectangular Elements (FIG. 1)>

| Rectangular Element | Shades | Height h ($\mu$m) |
| --- | --- | --- |
| E4 | White | 0.83 |
| E3 | Light Gray | 0.56 |
| E2 | Dark Gray | 0.28 |
| E1 | Black | 0.00 |

If it is assumed that the diffraction angle is θ, the wavelength is λ, and the rating pitch is Λ, then the equation $\sin \theta = \lambda/\Lambda$ holds. In addition, on the diffusive surface (FSa), the farther a random pattern structure is located away from the optical axis (AX), the larger the proportion of high-frequency components among the grating pitches found therein, with the grating pitch A varying in such a way that identical grating pitches are found concentrically around the optical axis (AX) as will be understood from FIGS. 3 to 6. Accordingly, the farther the location at which an off-axial ray is incident on the diffusive surface (FSa) is away from the optical axis (AX), the more the ray is deflected. Thus, a light-condensing power is achieved with which even the off-axial rays incident on the viewfinder screen at the very edges thereof are directed to the pupil (EP). Giving the diffusive surface (FSa) a light-condensing power like this eliminates the need for a Fresnel lens, and thus makes it possible to brighten the whole viewfinder screen without sacrificing the imaging performance.

As shown in FIG. 3, four display surfaces (FSb) are disposed on the identical plane on which the diffusive surface (FSa) is disposed. As shown in FIG. 5, these display surfaces (FSb) are formed as diffraction gratings having regular periodical structures. These periodical structures are composed of a plurality of minute rectangular elements having a plurality of types of heights and arranged regularly. That is, these periodical structures are composed by arranging, here with regular periods, rectangular elements (E1–E4) having the same types of heights as those constituting the diffusive surface (FSa). This makes it possible to produce intense diffracted light with the display surfaces (FSb) alone. The relationship between the shades with which the individual rectangular elements (E1–E4) are illustrated (FIG. 5) and their heights h ($\mu$m) is the same as shown in Table 1.

By forming the display surfaces (FSb) with different patterns from the random pattern structures (P41) of the diffusive surface (FSa) in such a way that light is diffused with different diffusion angles by the display surfaces (FSb) and by the diffusive surface (FSa), it is possible to achieve an image-displaying function by exploiting the difference in brightness between them. However, here, to obtain intense diffracted light from the display surfaces (FSb) alone, the display surfaces (FSb) are formed as diffraction gratings having regular periodic structures. Thus, the periodic structures here need to be given only a light-directing function so as to direct illumination light coming from a particular direction to the pupil (EP) by diffraction, and thus do not need to be given a light-diffusing function.

Figure 7:
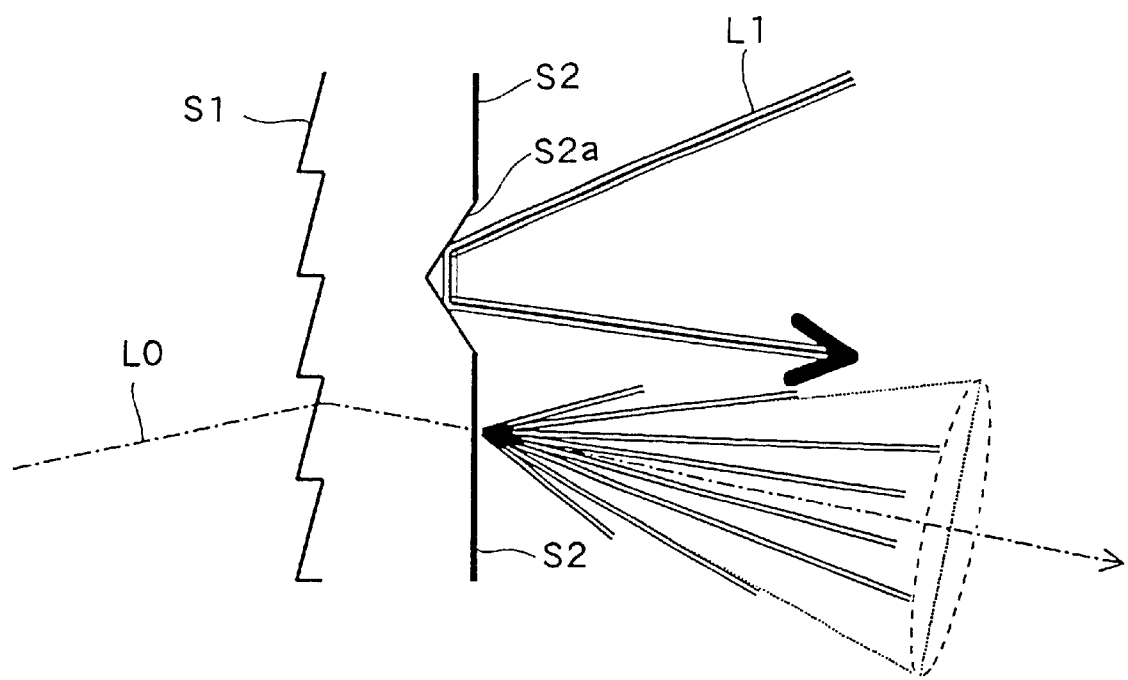
FIG. 7 is a sectional view of a conventional focusing screen.

As shown in FIG. 1, when the display surfaces (FSb) are illuminated with the illumination light (L1) from the illumination light emitter (ED, FIG. 2), the illumination light (L1) is, by the diffraction action of the display surfaces (FSb), directed toward the eyepiece lens (SL) so as to present display within the viewfinder screen as, for example, an AF frame. The illumination light emitter (ED) illuminates the display surfaces (FSb) with the illumination light (L1) from a direction different from the direction from which light (i.e. the light (L0) from the subject) is directed to the diffusive surface (FSa). The illumination light (L1) shone on the display surfaces (FSb) is, by the diffraction action of the display surfaces (FSb), made to exit therefrom in the same direction as the light exiting from the diffusive surface (FSa) (i.e. toward the eyepiece lens (SL)). The diffracted light produced on the display surfaces (FSb) has different characteristics from the diffracted light produced on the diffusive surface (FSa), and has sufficient intensity to offer bright display. The diffraction gratings constituting the display surfaces FSb) can be produced easily together with the random pattern structures (P40–P42) constituting the diffusive surface (FSa), and do not need to be treated with a reflection enhancement process as in the conventional example (FIG. 7).

It is preferable that the rectangular elements (E1–E4) constituting the display surfaces (FSb) each measure 0.1 to 1 $\mu$m along their shorter sides. Fulfilling this condition makes it possible to produce sufficiently intense diffracted light on the display surfaces (FSb). Rectangular elements with shorter sides measuring more than 1 $\mu$m do not offer sufficiently intense diffracted light, and rectangular elements with shorter sides measuring less than 0.1 $\mu$m make the display surfaces (FSb) difficult to produce.

Next, the diffusive screen of a second embodiment of the present invention will be described with reference to the drawings. This diffusive screen is a transmission-type diffusive screen suitable, for example, as a focusing screen for use in a single-lens reflex camera; however, its structure can be applied also to a reflection-type diffusive screen to obtain a diffusive screen suitable, for example, as a screen for image projection. The diffusive screen of the second embodiment has a diffusive surface that is formed by arranging a plurality of random pattern structures of one or a plurality of types. These random pattern structures are composed of a plurality of fine rectangular elements having three or more types of heights, and these rectangular elements are arranged irregularly so as to constitute a plurality of types of diffraction gratings having different grating pitches.

These diffraction gratings of a plurality of types are formed, for example, as a CGH. By superimposing a plurality of periodic structures having different heights on one another over a plurality of periods as a CGH, a plurality of types of diffraction gratings having different grating pitches are formed, and, as a result, random pattern structures as mentioned above having rectangular elements arranged irregularly are formed. The multiple periodicity resulting from this superimposition permits light to be diffracted at many angles distributed densely over a predetermined range of angles, and thereby makes the brightness of blurred appearance even. Thus, it is possible to obtain a satisfactorily high degree of blurred appearance with even brightness (i.e. smooth and natural blurred appearance) and a bright viewfinder screen. Here, the random pattern structures of a plurality of types may be arranged randomly, or may be arranged regularly with random pattern structures of given types arranged within given areas (for example in an arrangement that offers a light-condensing power). An example of the random pattern structures is shown in FIG. 10.

Figure 10:
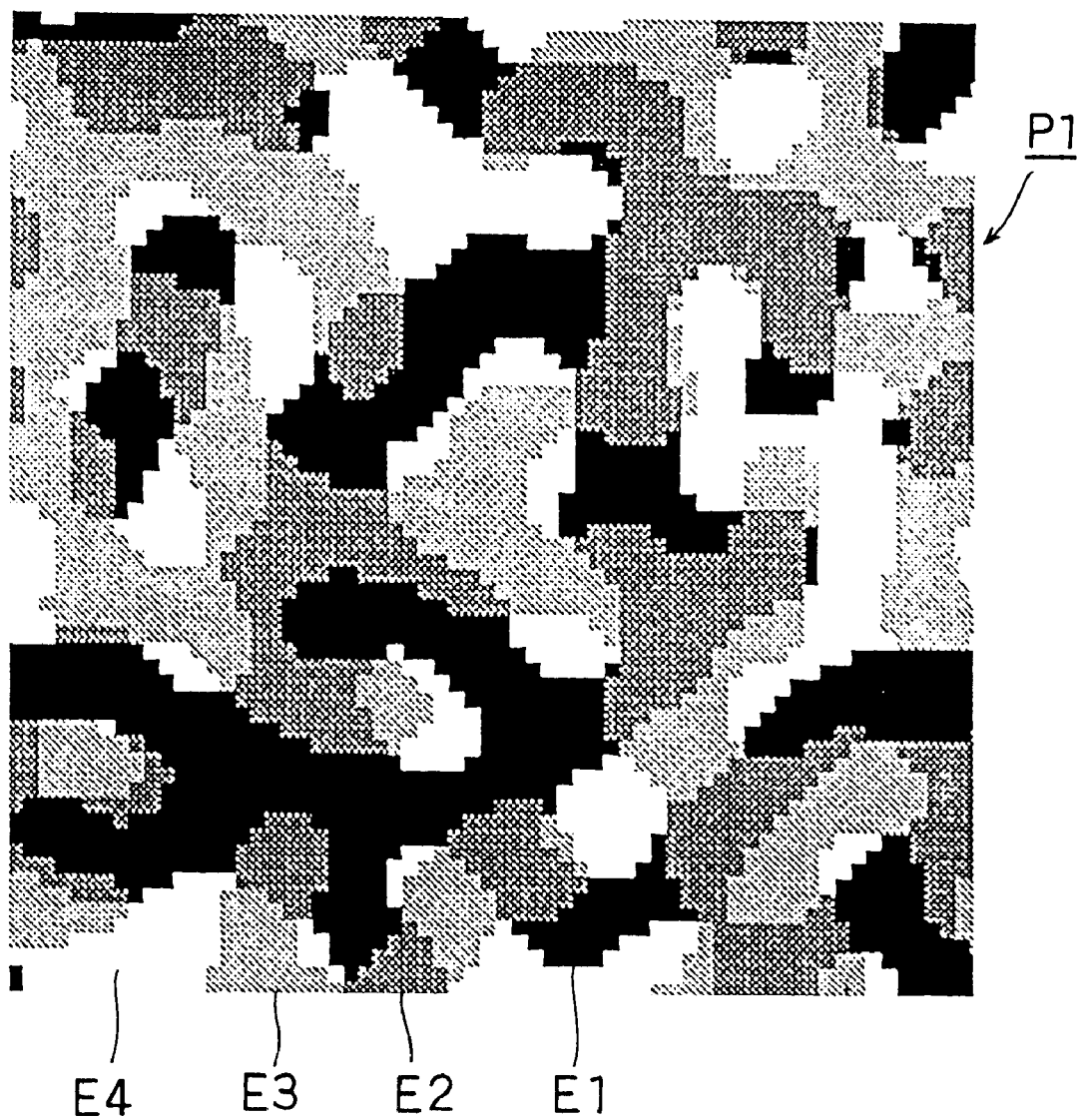
FIG. 10 is a plan view of a random pattern structure of the focusing screen of a second embodiment of the invention.

The random pattern structure (P1) shown in FIG. 10 is composed of a plurality of minute rectangular elements (E1, E2, E3, and E4) having four types of heights, and these rectangular elements (E1–E4) are arranged irregularly so as to form a plurality of types of diffraction gratings having different grating pitches. The rectangular elements (E1–E4) each have a rectangular section along a plane parallel to the diffusive surface and a substantially square-wave-shaped section (details will be given later) along a plane perpendicular to the diffusive surface. Accordingly, the above-mentioned diffraction gratings of a plurality of types are formed as phase-type multilevel diffraction gratings having binary structures of up to four levels. Moreover, the rectangular elements (E1–E4) each measure 0.5 μm along each side, and the random pattern structure (P1) has 64 rectangular elements E1–E4) along each side. Accordingly, one unit of the random pattern structure P1) measures 0.5 μm×64=32 μm square. By arranging this random pattern structure (P1) in a large number, it is possible to obtain a diffusive surface measuring, for example, 24×36 mm.

The relationship between the shades with which the individual rectangular elements (E1–E4) are illustrated in FIG. 10 and their heights h (μm) is shown in Table 2 below. Here, it is assumed that the diffusive screen is made of PMMA, and that its refractive index for the e line is ne=1.4914.

TABLE 2

<Heights of Rectangular Elements (FIG. 10)>

| Rectangular Element | Shades | Height h (μm) |
|---|---|---|
| E4 | White | 0.83 |
| E3 | Light Gray | 0.56 |
| E2 | Dark Gray | 0.28 |
| E1 | Black | 0.00 |

Figure 8:
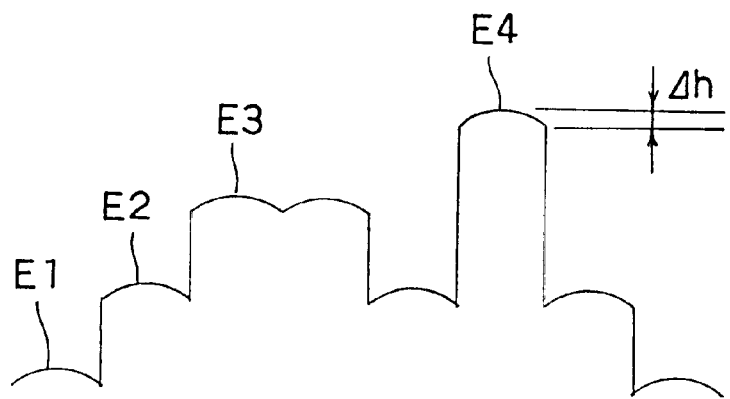
FIG. 8 is a sectional view of a principal portion of a random pattern structure having rectangular elements of which the top-end surfaces are formed into a convex, spherical shape.
Figure 9:
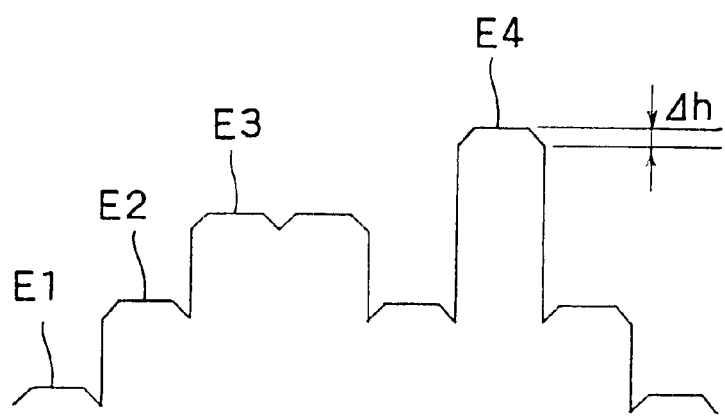
FIG. 9 is a sectional view of a principal portion of a random pattern structure having rectangular elements of which the top-end surfaces are formed into a convex, trapezoidal shape.

The rectangular elements (E1–E4) have their top-end surfaces formed into a convex shape. The convex shape may be, for example, a spherical shape as shown in FIG. 8 or a trapezoidal shape as shown in FIG. 9. The convex shape has a height Δh of 30 to 60 nm. By forming the top-end surfaces of the rectangular elements (E1–E4) into a convex shape, the convex surfaces form periodic structures smaller than those formed by the rectangular elements (E1–E4). Increasing the number of periodic patterns that are superimposed on one another in this way helps increase the number of angles at which light is diffracted, with the result that the periodic structures formed by the minute convex surfaces produce flare light. This flare light is added to the diffracted light produced by the above-mentioned diffraction gratings of a plurality of types, and this helps reduce the differences in intensity among light diffracted at different angles. Thus, it is possible to obtain denser and smoother diffused light and thus more natural blurred appearance.

Figure 11:
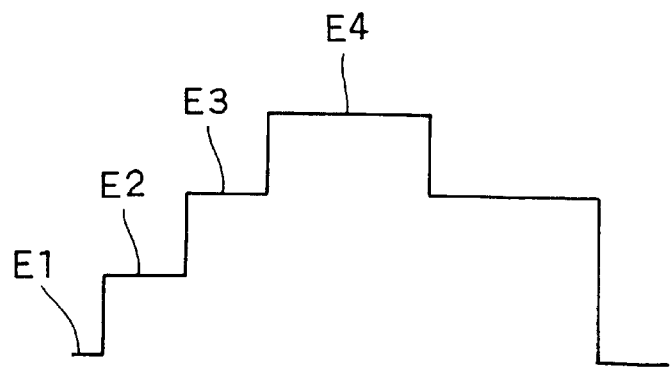
FIG. 11 is a sectional view of a principal portion of a random pattern structure having rectangular elements of which the top-end surfaces are flat.
Figure 12:
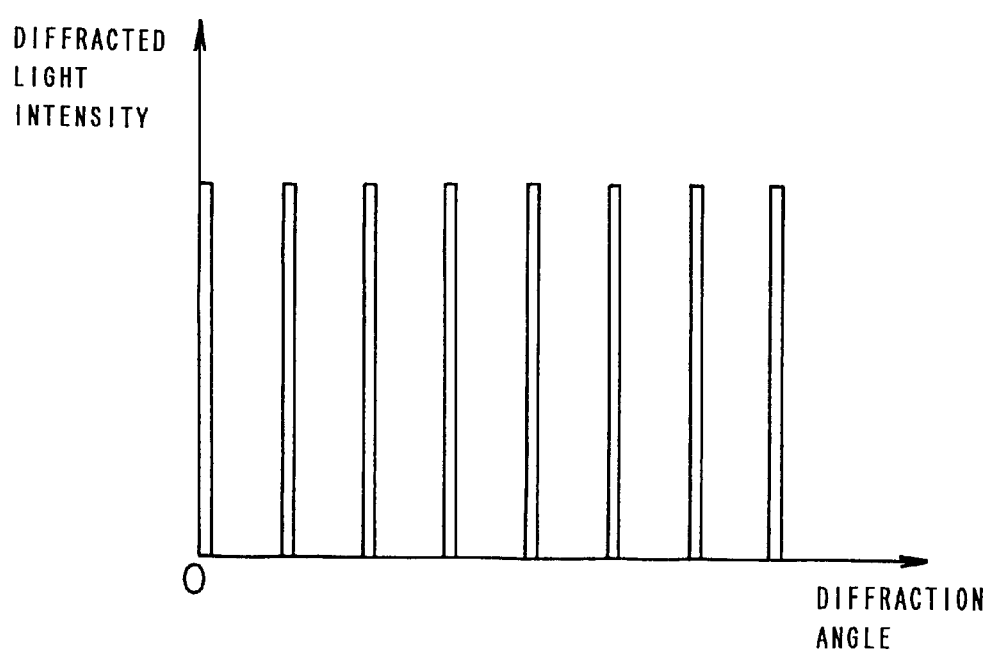
FIG. 12 is a graph showing the diffracted light intensity distribution obtained with a diffusive surface having the random pattern structure shown in FIG. 11.
Figure 13:
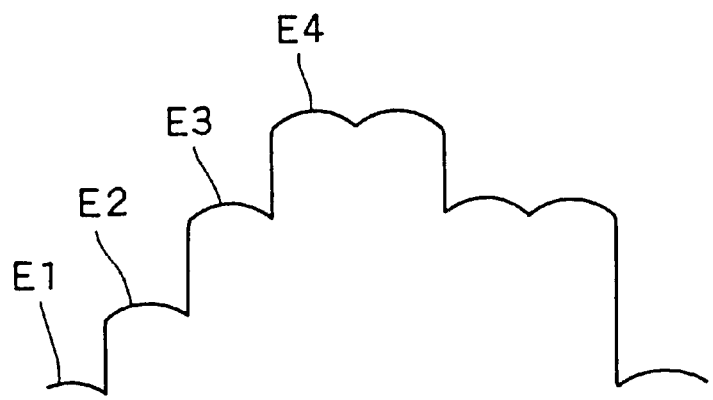
FIG. 13 is a sectional view of a principal portion of a random pattern structure having rectangular elements of which the top-end surfaces are formed into a convex, spherical shape.
Figure 14:
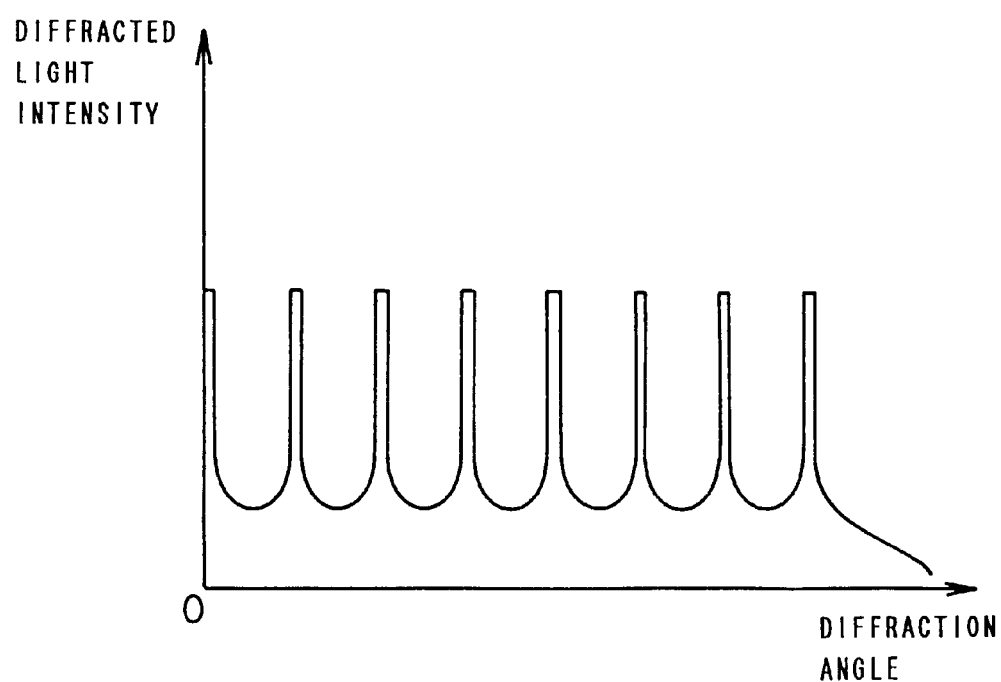
FIG. 14 is a graph showing the diffracted light intensity distribution obtained with a diffusive surface having the random pattern structure shown in FIG. 13.

In a case where, as shown in FIG. 11, the top-end surfaces of the rectangular elements (E1–E4) are flat, the diffusive surface composed of accordingly shaped random pattern structures exhibits diffracted light intensity distribution as shown in FIG. 12. By contrast, in a case where, as shown in FIG. 13, the top-end surfaces of the rectangular elements (E1–E4) are formed into a convex shape, the diffusive surface composed of accordingly shaped random pattern structures exhibits diffracted light intensity distribution as shown in FIG. 14. In these graphs, the diffraction angle is taken along the horizontal axis, and the intensity of diffracted light is taken along the vertical axis. As will be understood by comparing FIGS. 12 and 14, the flare light mentioned above reduces differences in intensity among light diffracted at different angles. This makes it possible to obtain denser and smoother blurred appearance.

It is preferable that the convex shape have a height Δh of 0.01 to 0.1 μm. The rectangular elements (E1–E4) constituting the above-described random pattern structure (P1) have a height Δh of 30 to 60 nm, and thus fulfills this condition. With a height lower than 0.01 μm, it is not possible to obtain sufficient flare light, and therefore it is difficult to obtain smooth diffused light. With a height higher than 0.1 μm, the diffraction gratings develop phase errors, which hinder the production of diffracted light.

Figure 21:
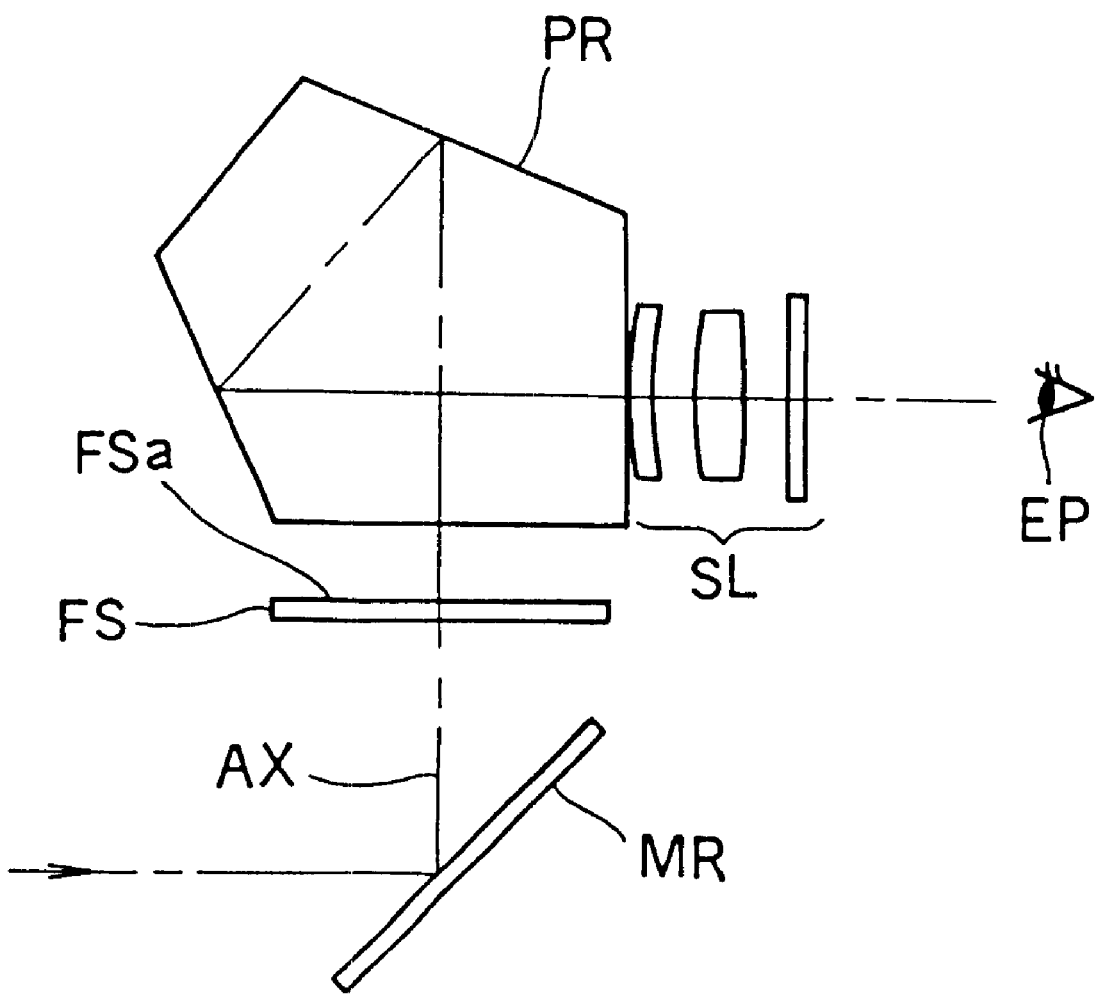
FIG. 21 is a sectional view showing the construction of a viewfinder for a single-lens reflex camera incorporating the focusing screen of a third embodiment.

FIG. 21 shows the construction of a viewfinder for a single-lens reflex camera incorporating the focusing screen of a third embodiment of the present invention. This viewfinder for a single-lens reflex camera is composed of a main mirror (MR), a focusing screen (FS), a pentagonal prism (PR), an eyepiece lens (SL), and other components. The symbol AX represents the optical axis. The focusing screen (FS) has a diffusive surface (FSa) having a light-diffusing function formed on the upper surface thereof. The light exiting from a taking lens (not shown) is reflected from the main mirror (MR), and then forms an image on the diffusive surface (FSa) of the focusing screen (FS). The diffused light exiting from the image formed on the diffusive surface (FSa) is subjected to image inversion by the pentagonal prism (PR), and then travels through the eyepiece lens (SL) to the pupil (EP).

The diffusive surface (FSa) of the focusing screen (FS) is formed by arranging a plurality of random pattern structures of one or a plurality of types. These random pattern structures are each composed of a plurality of minute rectangular elements having one of two to eight types of heights, and these rectangular elements are arranged irregularly so as to constitute a plurality of types of diffraction gratings having different grating pitches. These diffraction gratings of a plurality of types are formed, for example, as a CGH. By superimposing a plurality of periodic structures having different heights on one another over a plurality of periods as a CGH, a plurality of types of diffraction gratings having different grating pitches are formed, and, as a result, random pattern structures as mentioned above having rectangular elements arranged irregularly are formed. The multiple periodicity resulting from this superimposition permits light to be diffracted at many angles distributed densely over a predetermined range of angles, and thereby makes the brightness of blurred appearance even. Here, the random pattern structures of a plurality of types may be arranged randomly, or may be arranged regularly with random pattern structures of given types arranged within given areas (for example in an arrangement that offers a light-condensing power). Two practical examples of the random pattern structures will be described in detail below.

Figure 15:
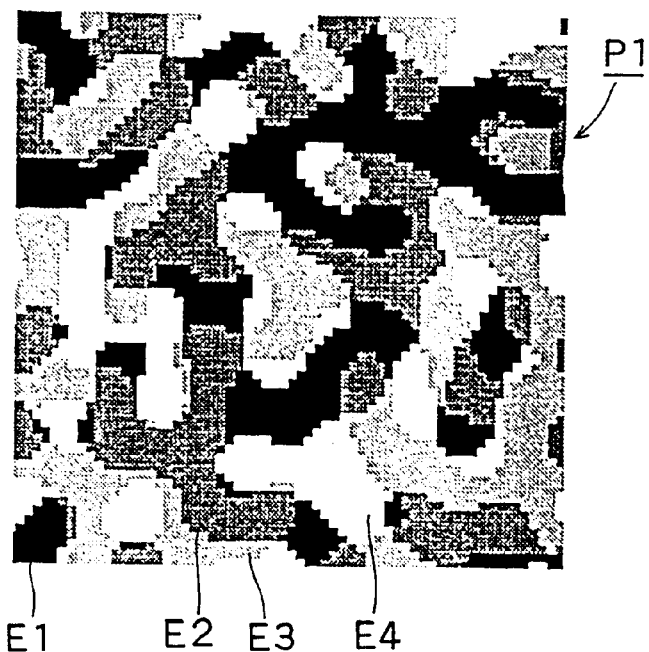
FIG. 15 is a plan view showing a random pattern structure measuring 32 μm along each side.
Figure 18:
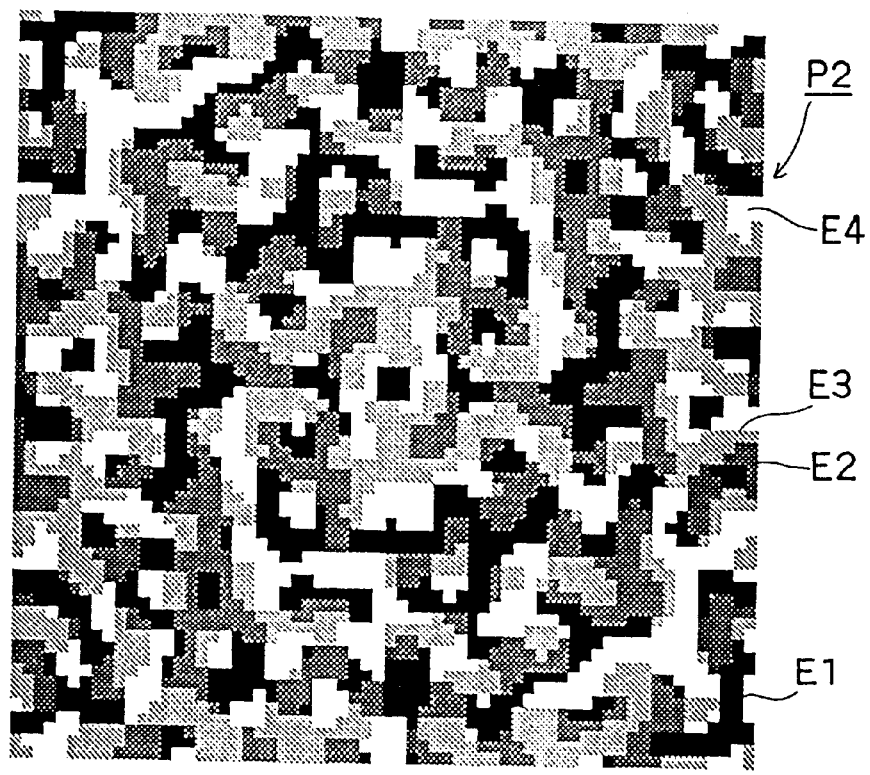
FIG. 18 is a plan view showing a random pattern structure measuring 64 μm along each side.

FIG. 15 shows a random pattern structure (P1) measuring 32 μm square, and FIG. 18 shows a random pattern structure (P2) measuring 64 μm square. Both of these random pattern structures (P1 and P2) are composed of a plurality of minute rectangular elements (E1, E2, E3, and E4) having four types of heights, and these rectangular elements (E1–4) are arranged irregularly so as to form a plurality of types of diffraction gratings having different grating pitches. The rectangular elements (E1–E4) each have a rectangular section along a plane parallel to the diffusive surface (FSa) and a substantially square-wave-shaped section (details will be given later) along a plane perpendicular to the diffusive surface (FSa). Accordingly, the above-mentioned diffraction gratings of a plurality of types are formed as phase-type multilevel diffraction gratings having binary structures of up to four levels.

The relationship between the shades with which the individual rectangular elements (E1–E4) are illustrated in FIGS. 15 and 18 and their heights h (μm) is shown in Table 3 below. Here, it is assumed that the focusing screen (FS) is made of PMMA, and that its refractive index for the e line is ne=1.4914. FIGS. 17 and 20 show central portions of the random pattern structures (P1 and P2, respectively) as represented by figures indicating the heights (0, 28, 56, and 83 for E1, E2, E3, and E4, respectively) of the individual rectangular elements (E1–E4).

TABLE 3

<Heights of Rectangular Elements (FIGS. 15 and 18)>

| Rectangular Element | Shades | Height h (μm) |
|---|---|---|
| E4 | White | 0.83 |
| E3 | Light Gray | 0.56 |
| E2 | Dark Gray | 0.28 |
| E1 | Black | 0.00 |

The rectangular elements (E1–E4) constituting the random pattern structure (P1) shown in FIG. 15 each measure 0.5 μm along each side, and the random pattern structure (P1) has 64 rectangular elements (E1–E4) along each side. Accordingly, one unit of the random pattern structure (P1) measures 0.5 μm×64=32 μm square. On the other hand, the rectangular elements (E1–E4) constituting the random pattern structure (P2) shown in FIG. 18 each measure 1 μm along each side, and the random pattern structure (P2) has 64 rectangular elements (E1–E4) along each side. Accordingly, one unit of the random pattern structure (P2) measures 1 μm×64=64 μm square. By arranging these random pattern structures (P1 and P2) in a large number, it is possible to obtain a diffusive surface (FSa) measuring, for example, 24×36 mm.

Figure 16:
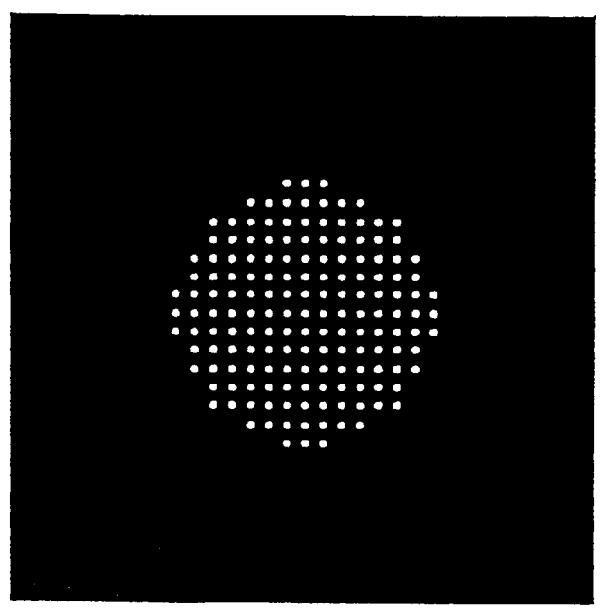
FIG. 16 is a diagram showing the pattern of the diffracted light obtained with a diffusive surface having the random pattern structure shown in FIG. 15.
Figure 19:
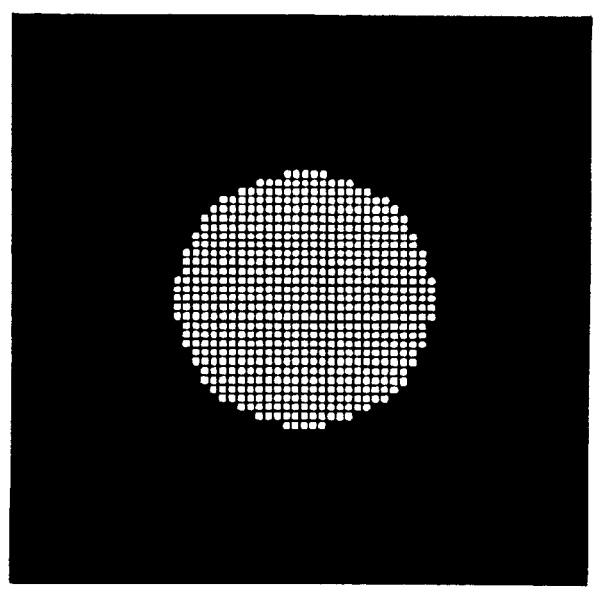
FIG. 19 is a diagram showing the pattern of the diffracted light obtained with a diffusive surface having the random pattern structure shown in FIG. 18.

FIG. 16 shows the pattern of the diffracted light obtained with a focusing screen (FS) having a diffusive surface (FSa) composed solely of random pattern structures (P1), and FIG. 19 shows the pattern of the diffracted light obtained with a focusing screen (FS) having a diffusive surface (FSa) composed solely of random pattern structures (P2). In FIGS. 16 and 19, the deviation from the center of the figure represents the diffraction angle, with the outermost spots representing a diffraction angle of 7° (corresponding to an f-number of 4). These patterns are spot patterns that are projected when a parallel laser beam is shone on the diffusive surface (FSa), with white spots indicating angles at which diffracted light is most intense. The diffusive surface (FSa) composed of random pattern structures (P1) produces spots of diffracted light at about 200 locations, and thus offers not quite satisfactorily but moderately dense and smooth blurred appearance. On the other hand, the diffusive surface (FSa) composed of random pattern structures (P2) produces spots of diffracted light at about 600 locations, and thus offers satisfactorily dense and smooth blurred appearance.

As will be understood from the patterns of the diffracted light shown in FIGS. 16 and 19, by using a diffusive surface (FSa) composed of random pattern structures (P1 and P2) as described above, it is possible to permit light to be diffracted at many angles distributed densely over a predetermined range of angles. Thus, it is possible to obtain a satisfactorily high degree of blurred appearance with even brightness (i.e. smooth and natural blurred appearance) and a bright viewfinder screen.

It is preferable that the rectangular elements each measure 0.1 to 5 μm along each side, and more preferably 0.2 μm or more. The rectangular elements (E1–E4) constituting the random pattern structures (P1 and P2) described above each measure 0.5 μm square and 1 μm square, respectively, and thus fulfill this condition. Fulfilling this condition makes it possible to produce diffracted light at diffraction angles corresponding to f-numbers of 2.8 to 11. With rectangular elements measuring less than 0.2 μm along each side, it is difficult to produce a focusing screen (FS); with rectangular elements measuring less than 0.1 μm along each side, it is more difficult to produce a focusing screen (FS). With rectangular elements measuring more than 5 μm along each side, light is diffracted at small angles, and thus it is difficult to obtain a satisfactorily high degree of blurred appearance.

It is preferable that the random pattern structures be rectangular and measure 30 μm or more along each side. The random pattern structures (P1 and P2) described above measure 32 μm square and 64 μm square, respectively, and thus fulfill this condition. Fulfilling this condition makes it possible to produce diffracted light densely at many diffraction angles. With random pattern structures measuring less than 30 μm along each side, light is diffracted at an insufficient number of diffraction angles, and thus it is difficult to obtain natural blurred appearance. For similar reasons, more preferably, the random pattern structures are so formed as to measure 50 to 100 μm along each side.

It is preferable that the rectangular elements fulfill, in terms of their heights, the following condition (i):

$$h\text{max} \leq 0.65/(n-1) \tag{i}$$

where hmax represents the maximum height (μm) of the rectangular elements, and n represents the refractive index of the rectangular elements.

A focusing screen for use in a camera is typically expected to be used in a wavelength range from about 0.4 to 0.7 μm. Accordingly, the refractive index n in the condition (i) is a refractive index with respect to light of a wavelength range from about 0.4 to 0.7 μm. The highest rectangular elements (E4) among those constituting the random pattern structures (P1 and P2) have a height of 0.83 μm (=hmax). For example, if it is assumed that the refractive index for the e line is ne=1.4914, then 0.65/(1.4914−1)=1.32≧0.83, and thus the random pattern structures (P1 and P2) described above fulfill the condition (i). Fulfilling the condition (i) makes it possible to diffract white light efficiently. Deviating from the range defined by the condition (i) lowers the diffraction efficiency with respect to blue (B) to green (G) light, and thus produces tinged blurred appearance.

Figure 22:
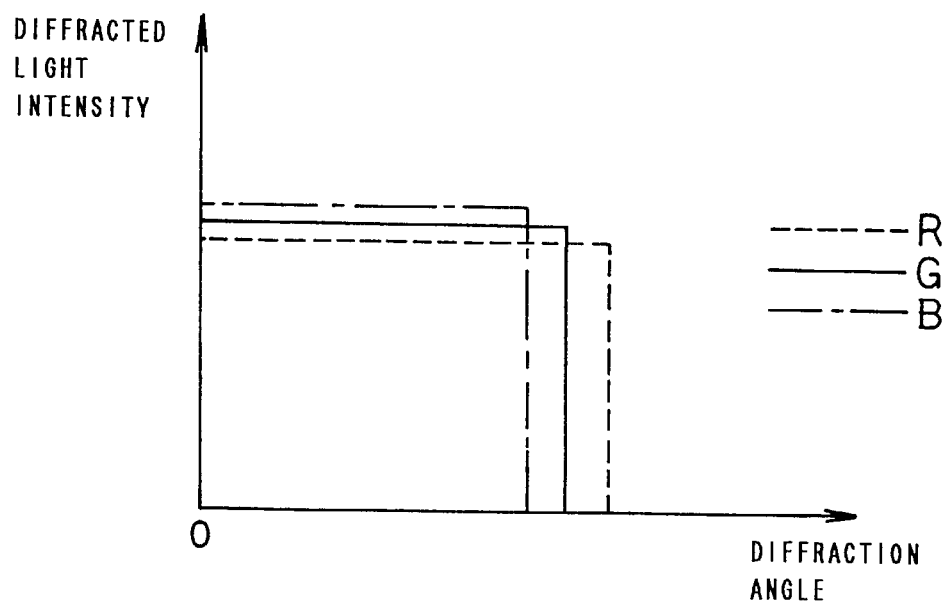
FIG. 22 is a graph showing the diffracted light intensity distribution obtained with rectangular elements 0.86 μm high.
Figure 23:
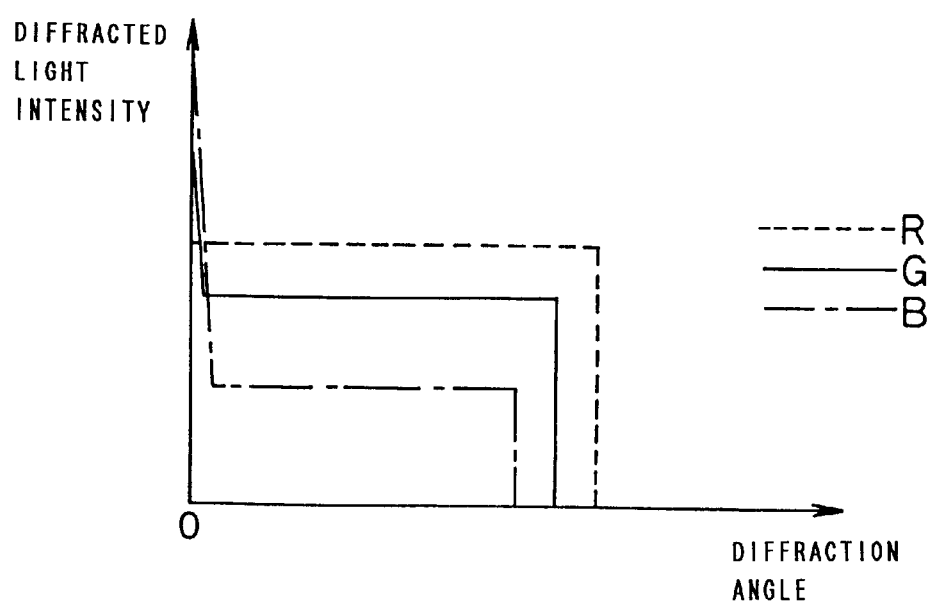
FIG. 23 is a graph showing the diffracted light intensity distribution obtained with rectangular elements 1.5 μm high.

The condition (i) noted above will be described in more detail in terms of the relationship between the maximum height hmax of the rectangular elements and the diffracted light intensity distribution. FIG. 22 shows the diffracted light intensity distribution obtained with a diffusive surface (FSa) composed of random pattern structures having a maximum rectangular element height hmax of 0.86 μm, and FIG. 23 shows the diffracted light intensity distribution obtained with a diffusive surface (FSa) composed of random pattern structures having a maximum rectangular element height hmax of 1.5 μm. In these graphs showing diffracted light intensity distribution, the diffraction angle is taken along the horizontal axis, and the intensity of diffracted light is taken along the vertical axis (the same is true with similar graphs described hereafter). If it is assumed that n=1.5, then 0.65/(n−1)=1.3. Thus, in the case shown in FIG. 22, the condition (i) is fulfilled (hmax=0.86 μm<1.3); by contrast, in the case shown in FIG. 23, the condition (i) is not fulfilled (hmax=1.5 μm>1.3).

When the condition (i) is fulfilled, as will be understood from FIG. 22, an even distribution of intensity is achieved over the entire range of intended diffraction angles, from straight-traveling light (diffracted at 0°) to most diffracted. Moreover, a substantially even distribution of intensity is achieved also over the range from red (R) to blue (B). Thus, it is possible to observe the viewfinder image with blurred appearance free of any unnecessary tinge. When the condition (i) is not fulfilled, as will be understood from FIG. 23, straight-traveling blue (B) to green (G) light exhibits disproportionately high intensity. As a result, as the taking lens is stopped down, the viewfinder image is observed with blurred appearance having a tinge of cyan, and, as the taking lens is opened up, the viewfinder image is observed with blurred appearance having a tinge of yellow.

Figure 24:
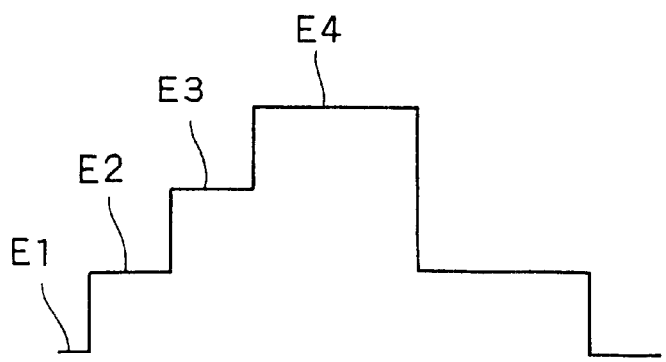
FIG. 24 is a sectional view of a principal portion of a random pattern structure having rectangular elements of which the top-end surfaces have rectangular edges.
Figure 25:
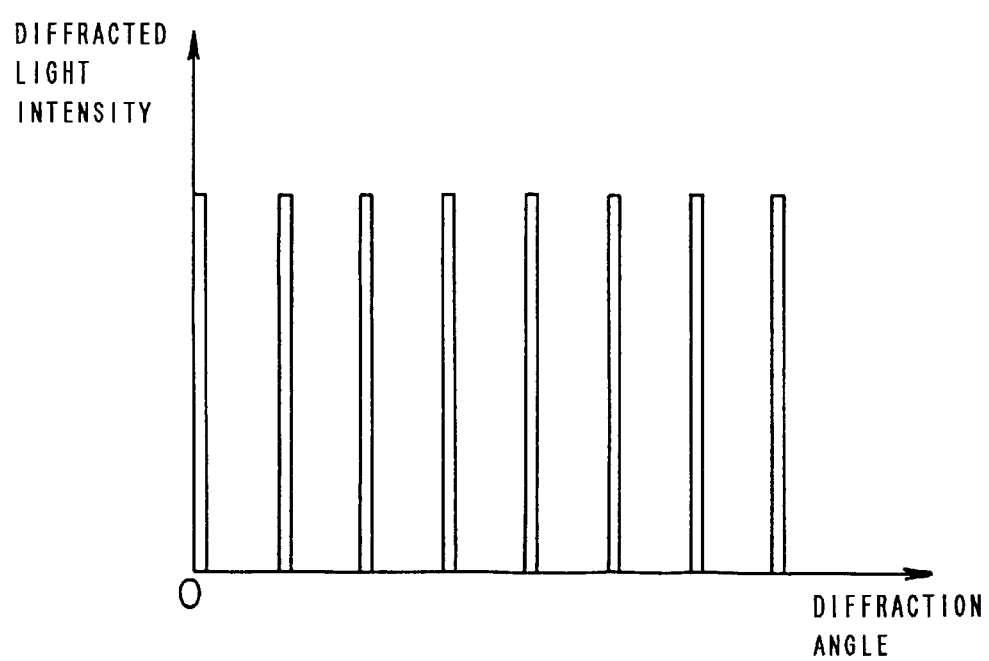
FIG. 25 is a graph showing the diffracted light intensity distribution obtained with a diffusive surface having the random pattern structure shown in FIG. 24.
Figure 26:
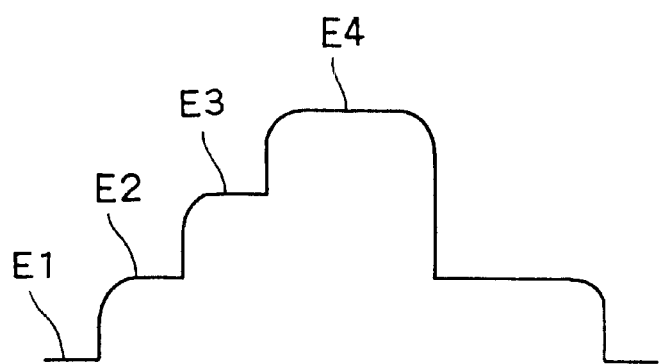
FIG. 26 is a sectional view of a principal portion of a random pattern structure having rectangular elements of which the top-end surfaces have rounded edges.
Figure 27:
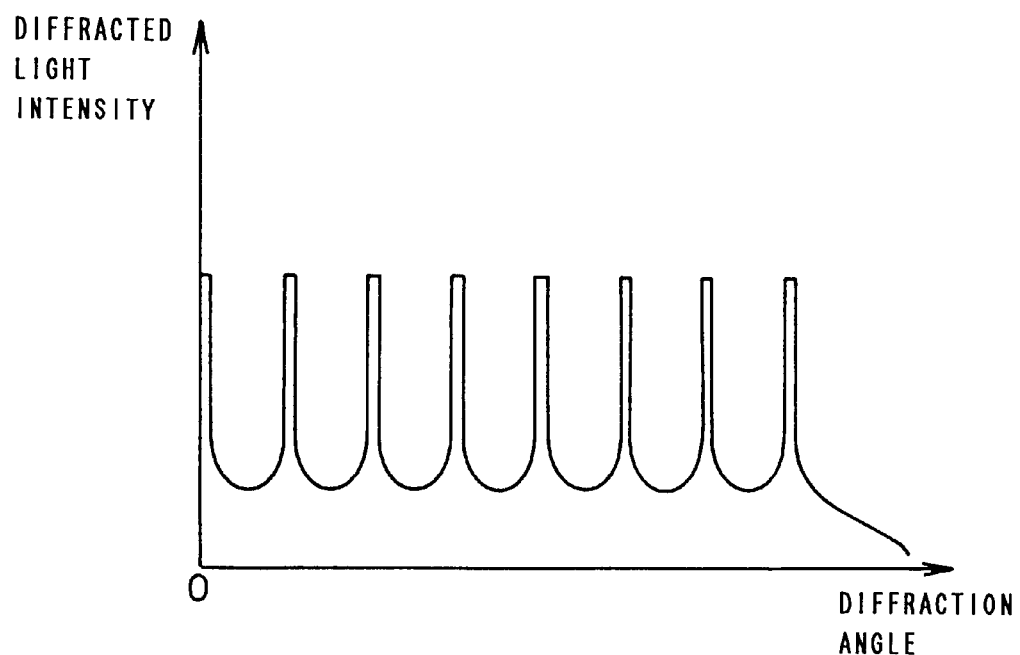
FIG. 27 is a graph showing the diffracted light intensity distribution obtained with a diffusive surface having the random pattern structure shown in FIG. 26.

It is preferable that the top-end surfaces of the rectangular elements have rounded edges. When the top-end surfaces of the rectangular elements have rounded edges, the curved surfaces of those rounded edges produce flare light. This flare light is added to the diffracted light produced by the above-mentioned diffraction gratings of a plurality of types, and this makes it possible to produce more natural blurred appearance. For example, if, as shown in FIG. 24, the top-end surfaces of the rectangular elements (E1–E4) have rectangular edges, the diffusive surface (FSa) composed of accordingly shaped random pattern structures exhibits diffracted light intensity distribution as shown in FIG. 25. By contrast, if, as shown in FIG. 26, the top-end surfaces of the rectangular elements (E1–E4) have rounded edges at those edges which are located above the corresponding edge of the next rectangular element (i.e. any of the four directly surrounding a given one), the diffusive surface (FSa) composed of accordingly shaped random pattern structures exhibits diffracted light intensity distribution as shown in FIG. 27. As will be understood by comparing FIGS. 25 and 27, the flare light mentioned above reduces differences in intensity among light diffracted at different angles. This makes it possible to obtain denser and smoother blurred appearance.

It is preferable that the rectangular elements have four or more types of heights. The random pattern structures (P1 and P2) described above are composed of rectangular elements (E1–E4) having four types of heights, and thus fulfill this condition. Fulfilling this condition helps obtain an even distribution of diffracted light intensity over the wide range of wavelengths covering white light, and thus makes it possible to produce more natural blurred appearance. If this condition is not fulfilled (i.e. if the rectangular elements have only two or three types of heights), straight-traveling blue (B) or red (R) light exhibits disproportionately high intensity, and thus produces tinged blurred appearance.

Figure 28:
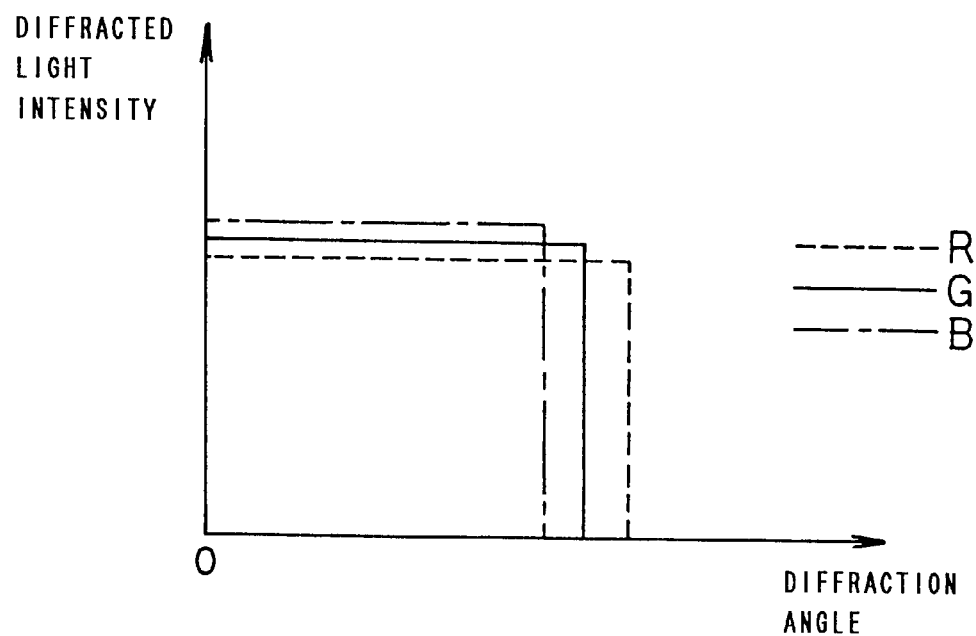
FIG. 28 is a graph showing the diffracted light intensity distribution obtained with rectangular elements having four types of heights.
Figure 29:
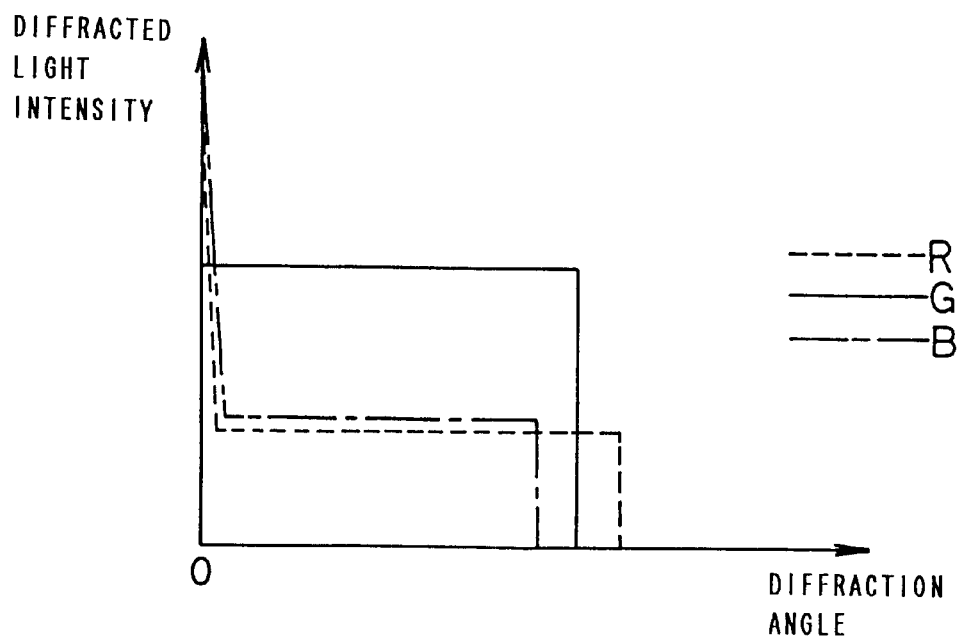
FIG. 29 is a graph showing the diffracted light intensity distribution obtained with rectangular elements having two types of heights.

FIG. 28 shows the diffracted light intensity distribution obtained with a diffusive surface (FSa) composed of random pattern structures with rectangular elements having four types of heights, and FIG. 29 shows the diffracted light intensity distribution obtained with a diffusive surface (FSa) composed of random pattern structures with rectangular elements having two types of heights. When the rectangular elements have four types of heights, as will be understood from FIG. 28, an even distribution of intensity is achieved over the entire range of intended diffraction angles, from straight-traveling light (diffracted at 0°) to most diffracted. Moreover, a substantially even distribution of intensity is achieved also over the range from red (R) to blue (B). Thus, it is possible to observe the viewfinder image with blurred appearance free of any unnecessary tinge. When the rectangular elements have two types of heights, as will be understood from FIG. 29, straight-traveling blue (B) and red (R) light exhibits disproportionately high intensity. As a result, as the taking lens is stopped down, the viewfinder image is observed with blurred appearance having a tinge of magenta, and, as the taking lens is opened up, the viewfinder image is observed with blurred appearance having a tinge of green.

Figure 31:
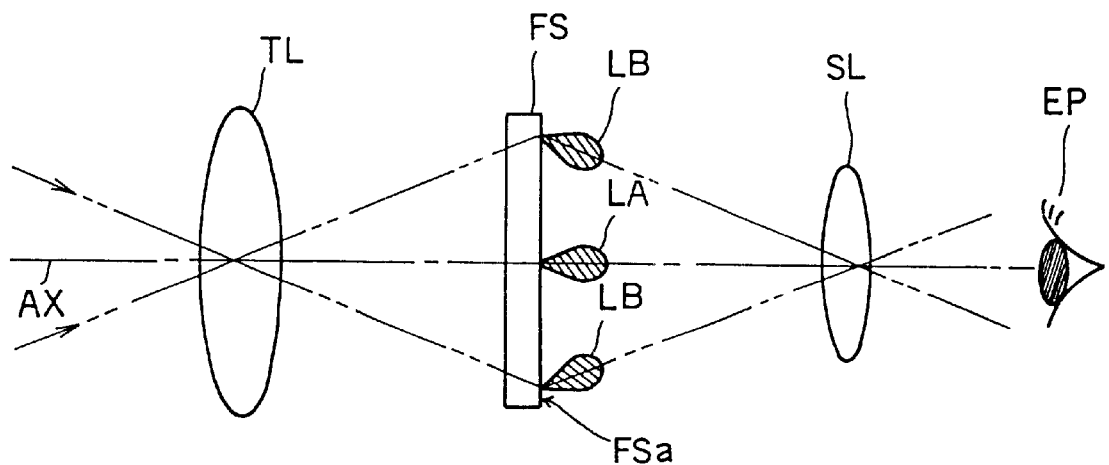
FIG. 31 is a diagram schematically showing the optical construction of a viewfinder optical system incorporating the focusing screen of a fourth embodiment of the invention.

FIG. 31 shows a viewfinder optical system incorporating a focusing screen of a fourth embodiment of the present invention. This viewfinder optical system is composed of a taking lens (TL), a focusing screen (FS), an eyepiece lens (SL), and other components. The focusing screen (FS) has a diffusive surface (FSa) having a light-diffusing function formed on its side facing the pupil (EP), and has a flat surface on the side thereof opposite to the diffusive surface (FSa) (i.e. on the side thereof facing the taking lens (TL). The light exiting from the taking lens (TL) forms an image on the diffusive surface (FSa) of the focusing screen (FS). The diffused light (LA and LB) exiting from the image formed on the diffusive surface (FSa) travels through the eyepiece lens (SL) to the pupil (EP). The diffusive surface (FSa) has a light-condensing power as will be described later, and therefore even the off-axial rays incident on the viewfinder screen at the very edges thereof, after image formation, travel, as diffused light (LB), toward the center of the eyepiece lens (SL).

The diffusive surface (FSa) of the focusing screen (FS) is formed by arranging a plurality of random pattern structures of a plurality of types. These random pattern structures are each composed of a plurality of minute rectangular elements having a plurality of types of heights, and these rectangular elements are arranged irregularly so as to constitute a plurality of types of diffraction gratings having different grating pitches. These diffraction gratings of a plurality of types are formed, for example, as a CGH. By superimposing a plurality of periodic structures having different heights on one another over a plurality of periods as a CGH, a plurality of types of diffraction gratings having different grating pitches are formed, and, as a result, random pattern structures as mentioned above having rectangular elements arranged irregularly are formed. The multiple periodicity resulting from this superimposition permits light to be diffracted at many angles distributed densely over a predetermined range of angles, and thereby makes the brightness of blurred appearance even. Thus, it is possible to obtain a satisfactorily high degree of blurred appearance with even brightness (i.e. smooth and natural blurred appearance) and a bright viewfinder screen.

Figure 32:
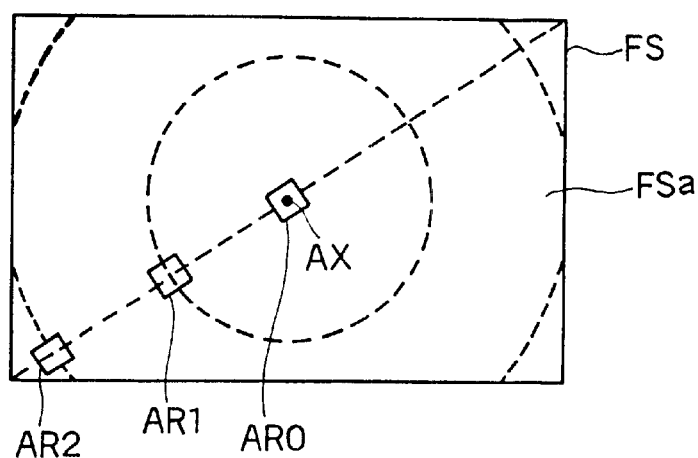
FIG. 32 is a plan view of the focusing screen shown in FIG. 31.

As described above, the diffusive surface (FSa) is composed of random pattern structures of a plurality of types. Here, the farther a random pattern structure is located away from the optical axis (AX) of the viewfinder optical system (i.e. the higher the image height), the larger the proportion of high-frequency components among the grating pitches found therein. That is, as shown in FIG. 32, if attention is paid to a central region (AR0), an intermediate region (AR1), and a peripheral region (AR2) of the viewfinder screen relative to the point at which the optical axis (AX) intersects it, the proportion of high-frequency components among the grating pitches (i.e. the proportion of diffraction gratings having comparatively small grating pitches) found in the random pattern structures located in those regions gradually increases in the order named. Moreover, the random pattern structures equidistant from the optical axis (AX) (i.e. the random pattern structures at identical image heights) have identical random patterns, and therefore identical random pattern structures are arranged concentrically around the optical axis (AX). This is true of any region located between the above-mentioned regions (AR0, AR1, and AR2).

Figure 30A:
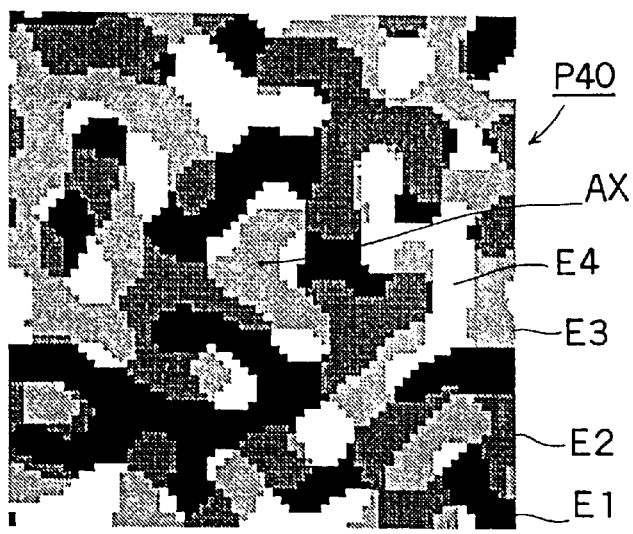
FIGS. 30A, 30B, and 30C are plan views showing random pattern structures composed of rectangular elements having four types of heights.
Figure 30B:
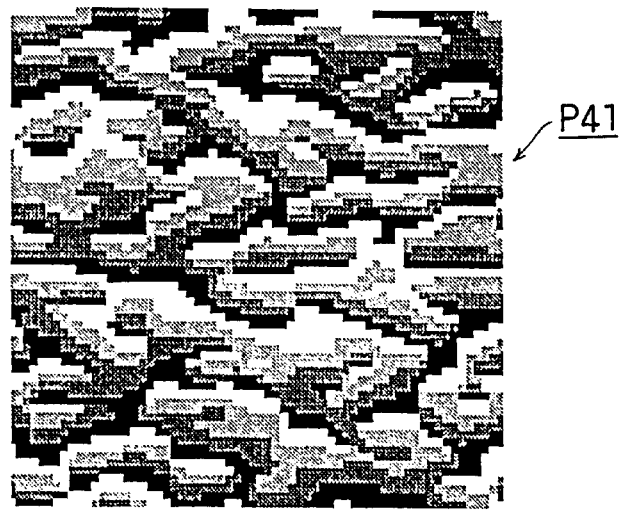
Figure 30C:
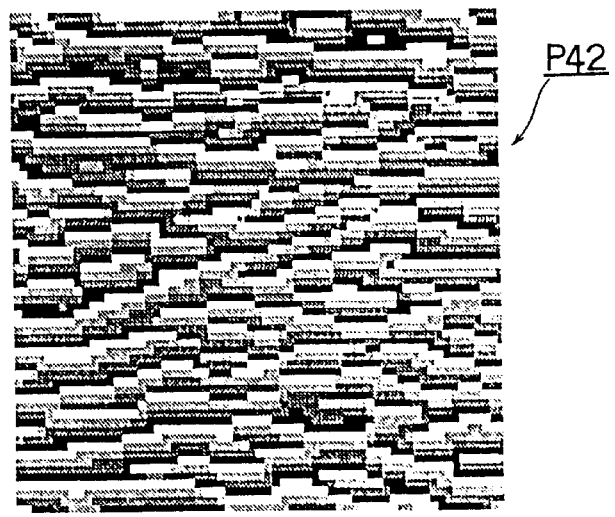

FIGS. 30A, 30B, and 30C show the random pattern structures located in the regions (AR0, AR1, and AR2, respectively) of the diffusive surface (FSa). FIG. 30A shows the random pattern structure (P40) located in the central region (AR0) of the viewfinder screen, FIG. 30B shows the random pattern structure (P41) located in the intermediate region (AR1), and FIG. 30C shows the random pattern structure (P42) located in the peripheral region (AR2). Note that the optical axis (AX) of the viewfinder optical system (FIG. 31) passes at the center of the random pattern structure (P40) shown in FIG. 30A and at a point located to the upper right (as seen from the viewer of the figure) of the random pattern structures (P41 and P42) shown in FIGS. 30B and 30C.

All of these random pattern structures (P40–P42) are composed of a plurality of minute rectangular elements (E1, E2, E3, and E4) having four types of heights, and these rectangular elements (E1–E4) are arranged irregularly so as to form a plurality of types of diffraction gratings having different grating pitches. The rectangular elements (E1–E4) each have a rectangular section along a plane parallel to the diffusive surface (FSa) and a square-wave-shaped section along a plane perpendicular to the diffusive surface (FSa). Accordingly, the above-mentioned diffraction gratings of a plurality of types are formed as phase-type multilevel diffraction gratings having binary structures of up to four levels.

The relationship between the shades with which the individual rectangular elements (E1–E4) are illustrated in FIGS. 30A, 30B, and 30C and their heights h ($\mu$m) is shown in Table 4 below. Here, it is assumed that the focusing screen (FS) is made of PMMA, and that its refractive index for the e line is ne=1.4914.

TABLE 4

<Heights of Rectangular Elements (FIGS. 30A, 30B, and 30C)>

| Rectangular Element | Shades | Height h ($\mu$m) |
|---|---|---|
| E4 | White | 0.83 |
| E3 | Light Gray | 0.56 |
| E2 | Dark Gray | 0.28 |
| E1 | Black | 0.00 |

If it is assumed that the diffraction angle is $\theta$, the wavelength is $\lambda$, and the grating pitch is $\Lambda$, then the equation $\sin \theta = \lambda/\Lambda$ holds. In addition, on the diffusive surface (FSa), the farther a random pattern structure is located away from the optical axis (AX), the larger the proportion of high-frequency components among the grating pitches found therein, with the grating pitch $\Lambda$ varying in such a way that identical grating pitches are found concentrically around the optical axis (AX) as will be understood from FIGS. 30A, 30B, 30C, and 32. Accordingly, the farther the location at which an off-axial ray is incident on the diffusive surface (FSa) is away from the optical axis (AX), the more the ray is deflected. Thus, a light-condensing power is achieved with which even the off-axial rays incident on the viewfinder screen at the very edges thereof are directed to the pupil (EP). Giving the diffusive surface (FSa) a light-condensing power like this eliminates the need for a Fresnel lens, and thus makes it possible to brighten the whole viewfinder screen without sacrificing the imaging performance.

Figure 33A:
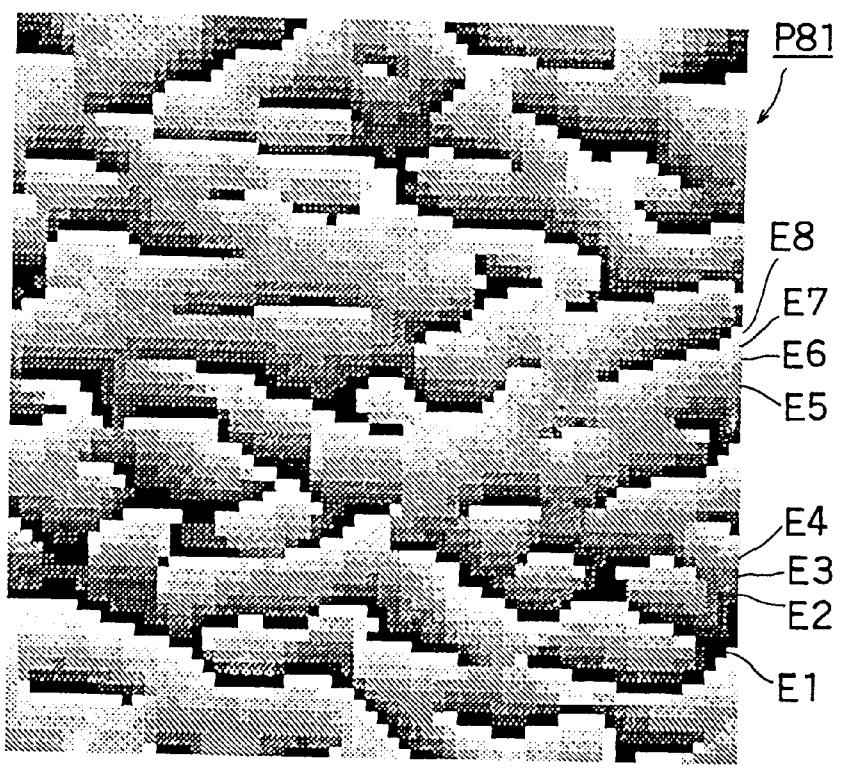
FIGS. 33A and 33B are plan views showing random pattern structures composed of rectangular elements having eight types of heights.
Figure 33B:
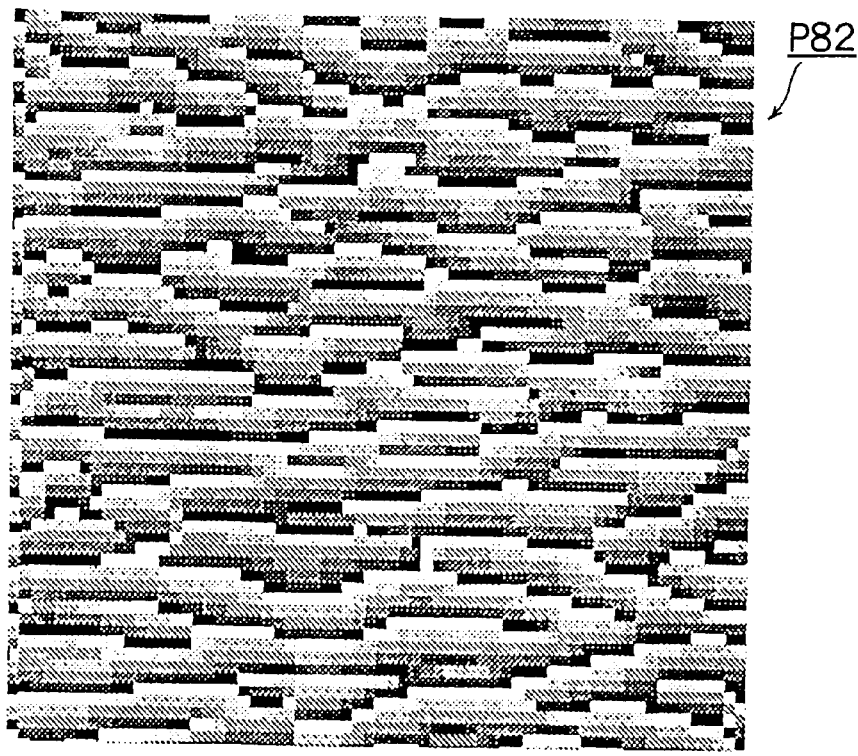

It is preferable that the elements constituting the random pattern structures described above have four or more types of heights. FIGS. 33A and 33B show random pattern structures (P81 and P82) with elements having eight types of heights. FIG. 33A shows the random pattern structure (P81) located in the intermediate region (AR1), and FIG. 33B shows the random pattern structure (P82) located in the peripheral region (AR2). The optical axis (AX) of the viewfinder optical system (FIG. 31) passes at a point located above (as seen from the viewer of the figure) the random pattern structures (P81 and P82) shown in FIGS. 33A and 33B.

Both of these random pattern structures (P81 and P82) are composed of a plurality of minute rectangular elements (E1, E2, E3, E4, E5, E6, E7, and E8) having eight types of heights, and these rectangular elements (E1–E8) are arranged irregularly so as to form a plurality of types of diffraction gratings having different grating pitches. The rectangular elements (E1–E8) each have a rectangular section along a plane parallel to the diffusive surface (FSa) and a square-wave-shaped section along a plane perpendicular to the diffusive surface (FSa). Accordingly, the above-mentioned diffraction gratings of a plurality of types are formed as phase-type multilevel diffraction gratings having binary structures of up to eight levels.

The relationship between the shades with which the individual rectangular elements (E1–E8) are illustrated in FIGS. 33A and 33B and their heights h ($\mu$m) is shown in Table 5 below. Here, it is assumed that the focusing screen (FS) is made of PMMA, and that its refractive index for the e line is ne=1.4914.

TABLE 5

<Heights of Rectangular Elements (FIGS. 33A and 33B)>

| Rectangular Element | Shades | | Height h ($\mu$m) |
|---|---|---|---|
| E8 | White | | 0.97 |
| E7 | Gray | Light | 0.83 |
| E6 | | ↑ | 0.69 |
| E5 | | | 0.56 |
| E4 | | | 0.42 |
| E3 | | ↓ | 0.28 |
| E2 | | Dark | 0.14 |
| E1 | Black | | 0.00 |

The diffusive surface (FSa) of the focusing screen (FS) described above achieves a light-condensing power by varying the grating pitch. However, it is also possible to achieve a light-condensing power by varying the maximum height of the rectangular elements. For example, it is preferable that any two adjacent random pattern structures fulfill the following condition (ii):

$$h1\max \leq h2\max \quad \text{(ii)}$$

where h1max represents the maximum height of the rectangular elements constituting the random pattern structures located close to the optical axis (AX) of the viewfinder optical system, and h2max represents the maximum height of the rectangular elements constituting the random pattern structures located far away from the optical axis (AX) of the viewfinder optical system.

Figure 34A:
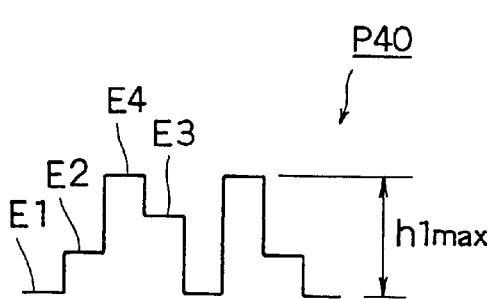
FIGS. 34A and 34B are enlarged sectional views of principal portions of random pattern structures in which different numbers of types of rectangular elements in terms of their heights are used at different image heights.
Figure 34B:
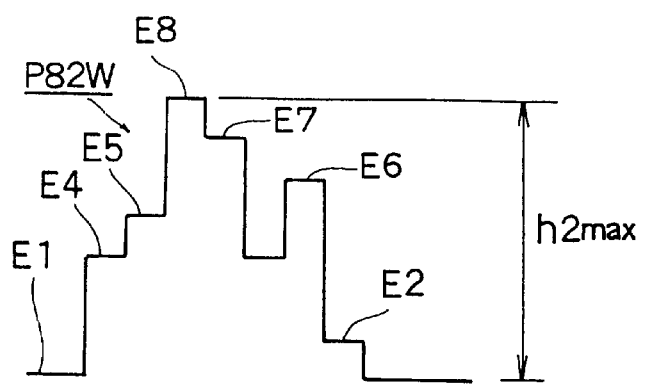
Figure 35A:
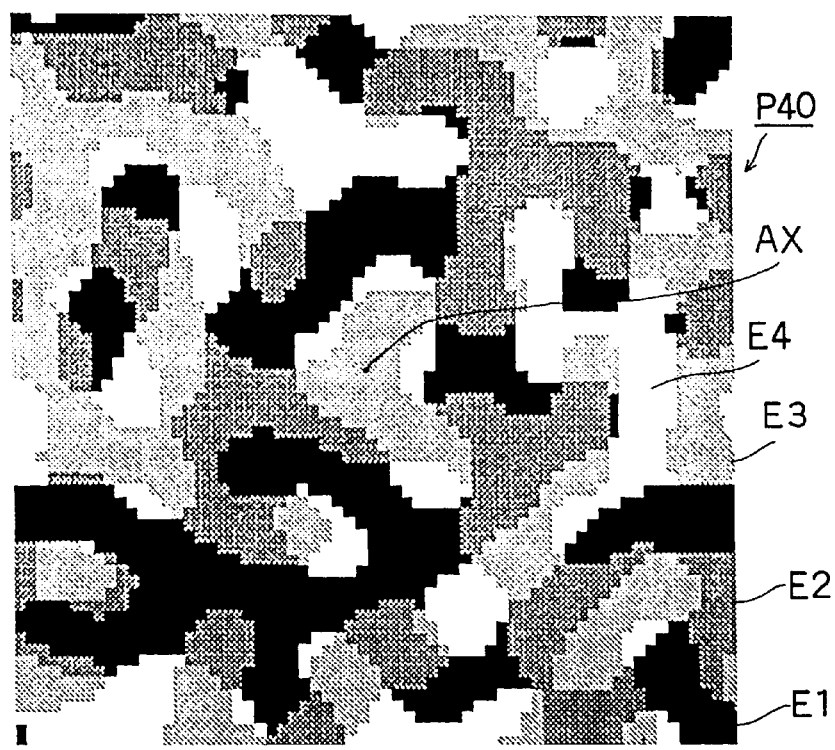
FIGS. 35A and 35B are plan views of the random pattern structures shown in FIGS. 34A and 34B.
Figure 35B:
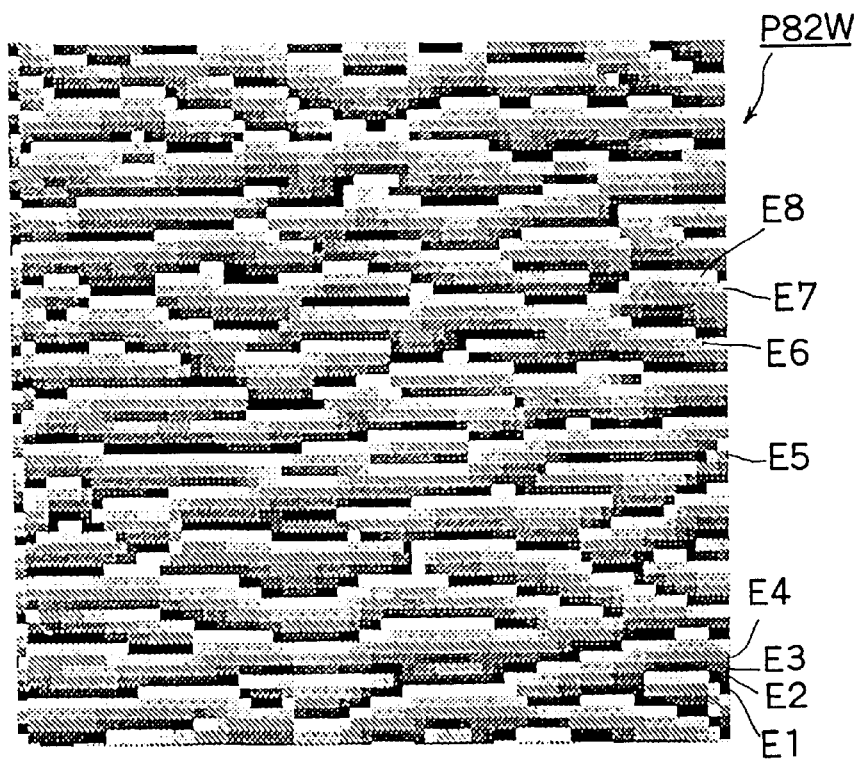

A diffusive surface (FSa) fulfilling the condition (ii) can be produced, for example, by arranging the random pattern structure (P40) shown in FIGS. 34A and 35A in the central region (AR0) of the viewfinder screen and the random pattern structure (P82W) shown in FIGS. 34B and 35B in the peripheral region (AR2). Note that the optical axis (AX) of the viewfinder optical system (FIG. 31) passes at the center of the random pattern structure (P40) shown in FIG. 35A and at a point located above (as seen from the viewer of the figure) the random pattern structure (P82W) shown in FIG. 35B.

The random pattern structure (P40) is composed of a plurality of minute rectangular elements (E1–E4) having four types of heights, and the random pattern structure (P82W) is composed of a plurality of minute rectangular elements (E1–E8) having eight types of heights. In both of these random pattern structures (P40 and P82W), the rectangular elements (E1–E8) are arranged irregularly so as to form a plurality of types of diffraction gratings having different grating pitches, and they each have a rectangular section along a plane parallel to the diffusive surface (FSa) and a square-wave-shaped section along a plane perpendicular to the diffusive surface (FSa). Accordingly, the above-mentioned diffraction gratings of a plurality of types are formed as phase-type multilevel diffraction gratings having binary structures whose maximum levels gradually vary from four to eight from the central region (AR0) to the peripheral region (AR2).

The relationship between the shades with which the individual rectangular elements (E1–E8) are illustrated in FIGS. 35A and 35B and their heights h ($\mu$m) is shown in Table 6 below. Here, it is assumed that the focusing screen (FS) is made of PMMA, and that its refractive index for the e line is ne=1.4914.

TABLE 6

<Heights of Rectangular Elements (FIGS. 35A and 35B)>

| FIG. 35A | | | FIG. 35B | | |
|---|---|---|---|---|---|
| Rectangular Elements | Shades | Height h ($\mu$m) | Rectangular Element | Shades | Height h ($\mu$m) |
| E4 | White | 0.83 | E8 | White | 1.96 |
| | | | E7 | Gray Light | 1.68 |
| E3 | Light Gray | 0.56 | E6 | ↑ | 1.40 |
| | | | E5 | | 1.12 |
| E2 | Dark Gray | 0.28 | E4 | | 0.83 |
| | | | E3 | ↓ | 0.56 |
| E1 | Black | 0.00 | E2 | Dark | 0.28 |
| | | | E1 | Black | 0.00 |

The random pattern structure (P40) located in the central region (AR0) has a maximum rectangular element height hmax of 0.83 $\mu$m, and the random pattern structure (P82W) located in the peripheral region (AR2) has a maximum rectangular element height hmax of 1.96 $\mu$m. From the central region (AR0) to the peripheral region (AR2), the number of types of the heights of the rectangular elements gradually varies from 4 to 8, and simultaneously the maximum height hmax of the rectangular elements gradually varies. Thus, any two adjacent random pattern structures fulfill the condition (ii). If it is assumed that the diffraction angle is θ, the wavelength is λ, the grating pitch is Λ, and the height of a rectangular element is h, then equations sin θ=λ/Λ and h=λ/(n−1) hold. These equations give an equation sin θ=h (n−1)/Λ. Accordingly, doubling the height h of a rectangular element results in doubling sin θ. That is, by varying the height of the rectangular elements, it is possible to deflect off-axial rays in such a way that, the farther the point at which a ray is incident on the diffusive surface (FSa) is away from the optical axis (AX), the more the ray is deflected.

Fulfilling the condition (ii) makes it possible to achieve a high light-condensing power with a fixed grating pitch Λ, and, with the thus obtained light-condensing power, it is possible to direct even the off-axial rays incident on the viewfinder screen at the very edges thereof to the pupil (EP). Deviating from the range defined by the condition (ii) makes it necessary to further reduce the grating pitch Λ in order to obtain a sufficiently high light-condensing power, and thus makes it difficult to produce the diffusive surface (FSa).

The random pattern structure (P40) is composed of rectangular elements (E1–E4) having four types of heights, and the random pattern structure (P82W) is composed of rectangular elements (E1–E8) having eight types of heights. It is preferable that, as in this example, the elements constituting the random pattern structures located far away from the optical axis (AX) (for example, those located in the peripheral region (AR2)) have a larger number of types of heights than the elements constituting the random pattern structures located close to the optical axis (AX) (for example, those located in the central region (AR0)). This helps prevent the lowering of diffraction efficiency in the peripheral region (AR2) of the viewfinder screen. If this condition is not fulfilled, diffraction efficiency lowers in the peripheral region (AR2) of the viewfinder screen, which may lead to unwanted darkening or tingeing.

What is claimed is:

1. A focusing screen for use in a camera, comprising:
   a diffusive surface having a plurality of random pattern cells of a plurality of types arranged two-dimensionally so as to form a macroscopically flat surface, wherein the random pattern cells are each composed of a plurality of minute rectangular elements having one of two to eight types of heights, the individual rectangular elements being arranged irregularly so as to constitute a plurality of types of diffraction gratings having different grating pitches.

2. A focusing screen as claimed in claim 1, wherein the rectangular elements each measure 0.1 to 5 $\mu$m along shorter sides thereof.

3. A focusing screen as claimed in claim 1, wherein the rectangular elements each measure 0.2 $\mu$m or more along shorter sides thereof.

4. A focusing screen as claimed in claim 1, wherein the random pattern cells are each rectangular and measure 30 $\mu$m or more along each side thereof.

5. A focusing screen as claimed in claim 1, wherein the following condition is fulfilled:

$$h\text{max} \leq 0.65/(n-1)$$

where hmax represents a maximum height ($\mu$m) of the rectangular elements, and n represents a refractive index of the rectangular elements.

6. A focusing screen as claimed in claim 1, wherein the rectangular elements have one of four or more types of heights.

7. A focusing screen for use in a camera, comprising:
   a diffusive surface having a plurality of random pattern cells of one or a plurality of types arranged two-dimensionally so as to form a macroscopically flat surface, wherein the random pattern cells are each composed of a plurality of minute rectangular elements having one of three or more types of heights, the individual rectangular elements being arranged irregularly so as to constitute a plurality of types of diffraction gratings having different grating pitches, the rectangular elements each having top-end surfaces thereof formed into a convex shape.

8. A focusing screen as claimed in claim 7, wherein the convex shape is a shape of a curved surface.

9. A focusing screen as claimed in claim 7, wherein the convex shape is a shape of a trapezoid.

10. A focusing screen as claimed in claim 7, wherein the convex shape is 0.01 to 0.1 $\mu$m high.

11. A focusing screen as claimed in claim 7, wherein the rectangular elements each measure 0.1 to 1 μm along shorter sides thereof.

12. A focusing screen as claimed in claim 7, wherein the random pattern cells are each rectangular and measure 30 μm or more along each side thereof.

13. A focusing screen for use in a camera, comprising:
a diffusive surface having a plurality of random pattern cells of one or a plurality of types arranged two-dimensionally so as to form a macroscopically flat surface, wherein the random pattern cells are each composed of a plurality of minute rectangular elements having one of three or more types of heights, the individual rectangular elements being arranged irregularly so as to constitute a plurality of types of diffraction gratings having different grating pitches; and
a display surface that is disposed on an identical plane on which the diffusive surface is disposed and that is formed as a diffraction grating configured so as to have regular periodic structures.

14. A focusing screen as claimed in claim 13, wherein the diffraction grating provided as the display surface and configured so as to have regular periodic structures is composed of a plurality of minute rectangular elements having one of a plurality of types of heights.

15. A focusing screen as claimed in claim 14, wherein the rectangular elements each measure 0.1 to 1 μm along shorter sides thereof.

16. A focusing screen as claimed in claim 13, wherein light illuminating the display surface is directed to the display surface from a direction different from a direction from which light is directed to the diffusive surface, and light exiting from the display surface travels in a direction identical with a direction in which light exiting from the diffusive surface travels.

17. A focusing screen as claimed in claim 13, wherein the random pattern cells are each rectangular and measure 30 μm or more along each side thereof.

18. A focusing screen for use in a camera, comprising:
a diffusive surface having a plurality of random pattern cells of a plurality of types arranged two-dimensionally so as to form a macroscopically flat surface, wherein the random pattern cells are each composed of a plurality of minute rectangular elements having one of two or more types of heights, the individual rectangular elements being arranged irregularly so as to constitute a plurality of types of diffraction gratings having different grating pitches,
wherein the rectangular elements have an increasingly large proportion of high-frequency components from a center to an edge of the focusing screen.

19. A focusing screen as claimed in claim 18, wherein random patterns equidistant from the center of the focusing screen are identical.

20. A focusing screen as claimed in claim 18, wherein the focusing screen has a flat surface on a side thereof opposite to the diffusive surface.

21. A focusing screen as claimed in claim 18, wherein any two adjacent random pattern cells fulfill the following condition;

$$h1\max \leq h2\max$$

where h1max represents a maximum height of that one of the two random pattern cells which is closer to the center of the focusing screen, and h2max represents a maximum height of that one of the two random pattern cells which is farther from the center of the focusing screen.

22. A focusing screen as claimed in claim 18, wherein the rectangular elements have a larger number of types of heights in random pattern cells located farther from the center of the focusing screen than in random pattern cells located closer to the center of the focusing screen.

23. A diffuser comprising:
a diffusive surface having a plurality of random pattern cells of one or a plurality of types arranged two-dimensionally so as to form a macroscopically flat surface, wherein the random pattern cells are each composed of a plurality of minute rectangular elements having one of three or more types of heights, the individual rectangular elements being arranged irregularly so as to constitute a plurality of types of diffraction gratings having different grating pitches, the rectangular elements each having top-end surfaces thereof formed into a convex shape.

* * * * *